United States Patent
Ruchti et al.

(10) Patent No.: US 12,458,294 B2
(45) Date of Patent: Nov. 4, 2025

(54) METHOD FOR SYNCHRONIZING BIOLOGICAL SIGNALS FROM DIFFERENT MONITORING DEVICES

(71) Applicant: Nihon Kohden Digital Health Solutions, Inc., Irvine, CA (US)

(72) Inventors: Timothy Ruchti, Gurnee, IL (US); Joshua Andrew Ehrenberg, Chattanooga, TN (US); Abel Lin, San Diego, CA (US)

(73) Assignee: NIHON KOHDEN DIGITAL HEALTH SOLUTIONS, LLC, Irvine, CA (US)

( * ) Notice: Subject to any disclaimer, the term of this patent is extended or adjusted under 35 U.S.C. 154(b) by 638 days.

(21) Appl. No.: 17/894,259

(22) Filed: Aug. 24, 2022

(65) Prior Publication Data

US 2023/0010946 A1   Jan. 12, 2023

Related U.S. Application Data

(63) Continuation-in-part of application No. 17/306,864, filed on May 3, 2021, now Pat. No. 11,496,232.

(51) Int. Cl.
  *G06N 20/00*   (2019.01)
  *A61B 5/00*    (2006.01)
  (Continued)

(52) U.S. Cl.
  CPC ............. *A61B 5/72* (2013.01); *A61B 5/0205* (2013.01); *A61B 5/30* (2021.01); *A61B 5/352* (2021.01); *A61B 5/369* (2021.01)

(58) Field of Classification Search
  None
  See application file for complete search history.

(56) References Cited

U.S. PATENT DOCUMENTS

| 5,708,432 A | 1/1998 | Reynolds et al. |
| 6,522,706 B1 | 2/2003 | Bahai et al. |
| | (Continued) | |

OTHER PUBLICATIONS

International Search Report and Written Opinion issued in PCT/US2022/027342 on Aug. 8, 2022 (11 pages).

(Continued)

*Primary Examiner* — Sithu Ko
(74) *Attorney, Agent, or Firm* — ARC IP Law, PC; Joseph J. Mayo

(57) ABSTRACT

A method for time-synchronizing waveforms from different patient monitors that does not require devices to have high-precision synchronized clocks or to be coupled to a triggering synchronization signal generator. Comparable signals may be obtained from different devices either by placing selected sensors from the devices in the same locations, or by filtering signals from one device to obtain a signal comparable to signals from another device. Filtering may for example transform waveforms into independent components and identify a component that matches a signal from another device. The comparable signals may then be transformed into frequency variation curves, such as time intervals between peak values, to facilitate detection of the time shift between the signals. Cross correlation of the frequency variation curves may be used to locate the precise time shift between the signals. Use of frequency variation curves may be more robust than directly comparing and correlating the original signals.

18 Claims, 30 Drawing Sheets

(51) Int. Cl.
    *A61B 5/0205*     (2006.01)
    *A61B 5/30*     (2021.01)
    *A61B 5/352*     (2021.01)
    *A61B 5/369*     (2021.01)

(56) References Cited

U.S. PATENT DOCUMENTS

| | | | |
|---|---|---|---|
| 7,788,110 | B2 | 8/2010 | Ogino et al. |
| 8,024,030 | B2 | 9/2011 | Douglas et al. |
| 8,180,440 | B2 | 5/2012 | McCombie et al. |
| 8,594,776 | B2 | 11/2013 | McCombie et al. |
| 8,684,942 | B2 | 4/2014 | Zhang et al. |
| 8,825,148 | B2 | 9/2014 | Zhang et al. |
| 9,219,600 | B1 | 12/2015 | Landon et al. |
| 9,486,148 | B2 | 11/2016 | Hseu |
| 9,565,633 | B2 | 2/2017 | Samardzija et al. |
| 10,061,791 | B2 * | 8/2018 | Phanishayee ........ G11B 27/034 |
| 10,356,001 | B1 | 7/2019 | Drakulic et al. |
| 10,646,165 | B2 * | 5/2020 | Krishnaswamy ...... A61B 5/024 |
| 11,207,028 | B2 * | 12/2021 | Shusterman ........... A61B 5/002 |
| 11,559,237 | B1 * | 1/2023 | Agrawal ............... A61B 5/7203 |
| 12,274,536 | B2 * | 4/2025 | Kimbahune ........... A61B 5/339 |
| 2004/0230105 | A1 * | 11/2004 | Geva ..................... A61B 5/316 600/509 |
| 2005/0249323 | A1 | 11/2005 | Konz |
| 2007/0087734 | A1 | 4/2007 | Hinterberger et al. |
| 2008/0218382 | A1 | 9/2008 | Kavaler |
| 2009/0131762 | A1 | 5/2009 | Pelzek et al. |
| 2010/0298654 | A1 | 11/2010 | McCombie et al. |
| 2013/0070777 | A1 | 3/2013 | Hutchison et al. |
| 2015/0157271 | A1 * | 6/2015 | Zhang ................ A61B 5/14551 600/324 |
| 2016/0338599 | A1 * | 11/2016 | DeBusschere ....... A61B 5/7246 |
| 2017/0249445 | A1 | 8/2017 | Devries et al. |
| 2019/0379408 | A1 | 12/2019 | Ma et al. |
| 2021/0128932 | A1 * | 5/2021 | McErlean ............. A61B 5/318 |
| 2022/0094305 | A1 * | 3/2022 | Tang ....................... A61B 5/28 |
| 2022/0296105 | A1 * | 9/2022 | Drakos ................ A61B 5/0215 |

OTHER PUBLICATIONS

Matsuda, et al., "Onboard software of plasma wave experiment aboard Arase: Instrument management and signal processing of waveform capture/onboard frequency analyzer" Earth, Planets and Space 70.1 (2018) 1-22.

International Preliminary Report on Patentability issued in PCT/US2022/027342 on Nov. 16, 2023 (10 pages).

* cited by examiner

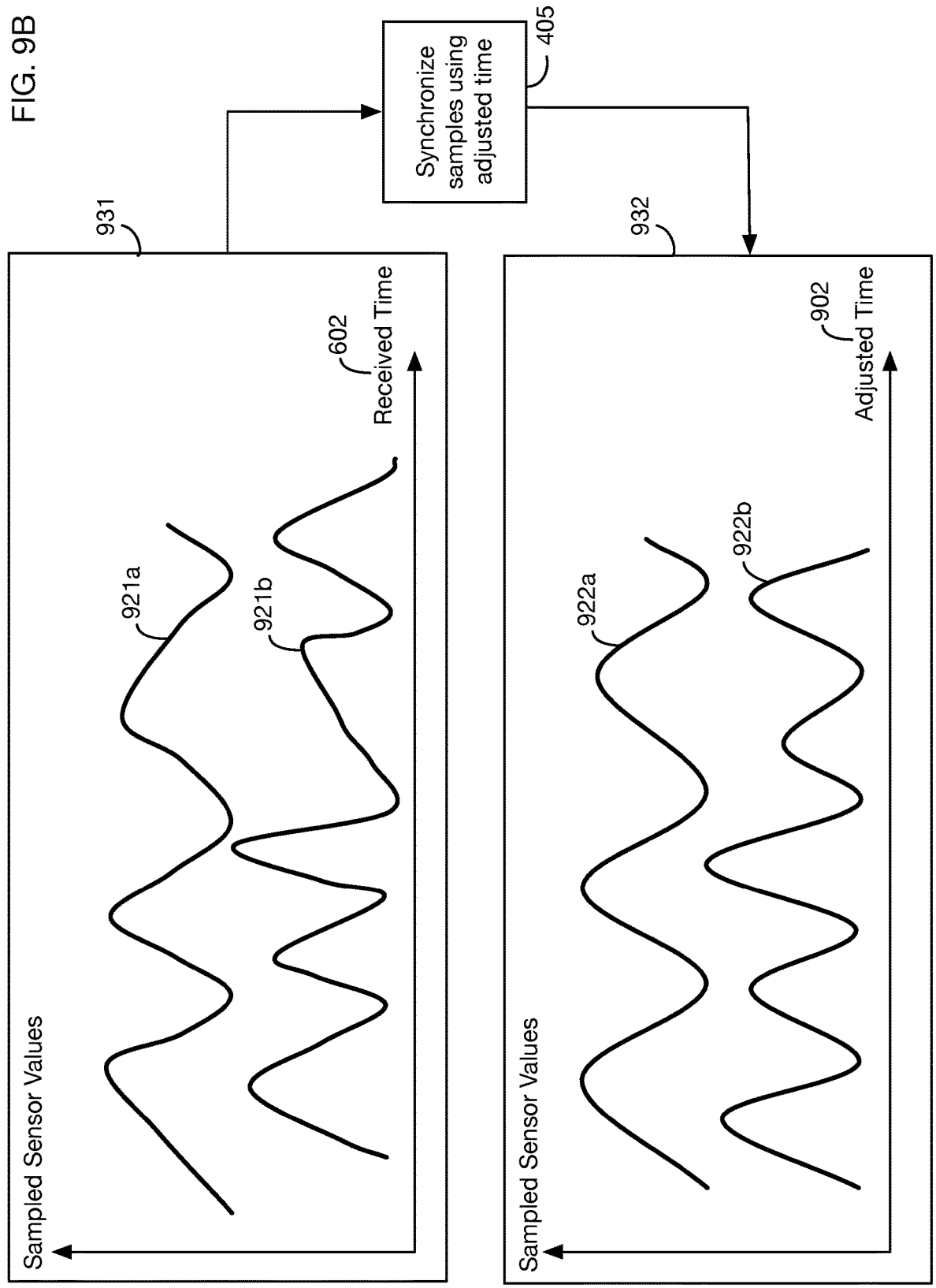

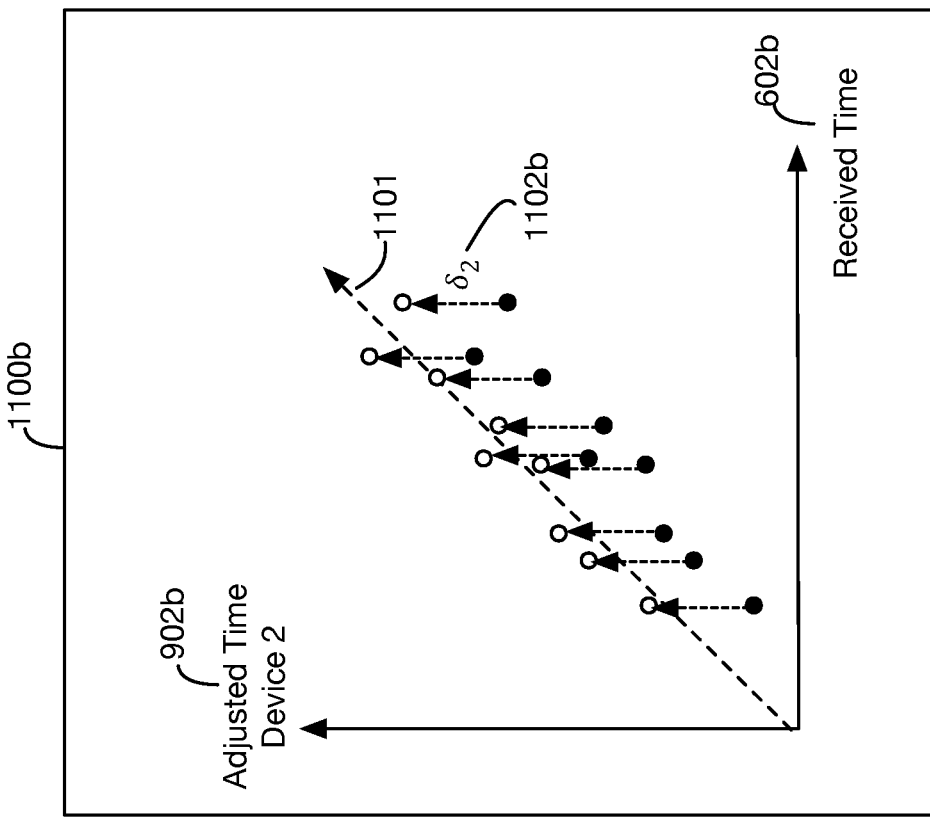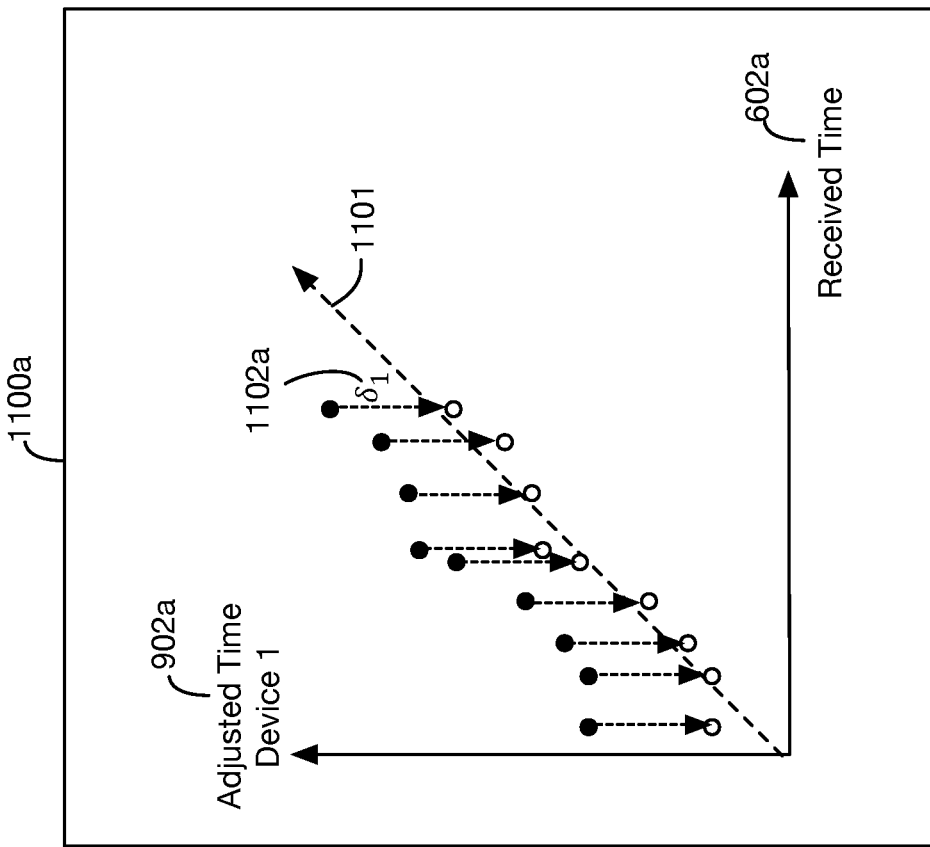
FIG. 11

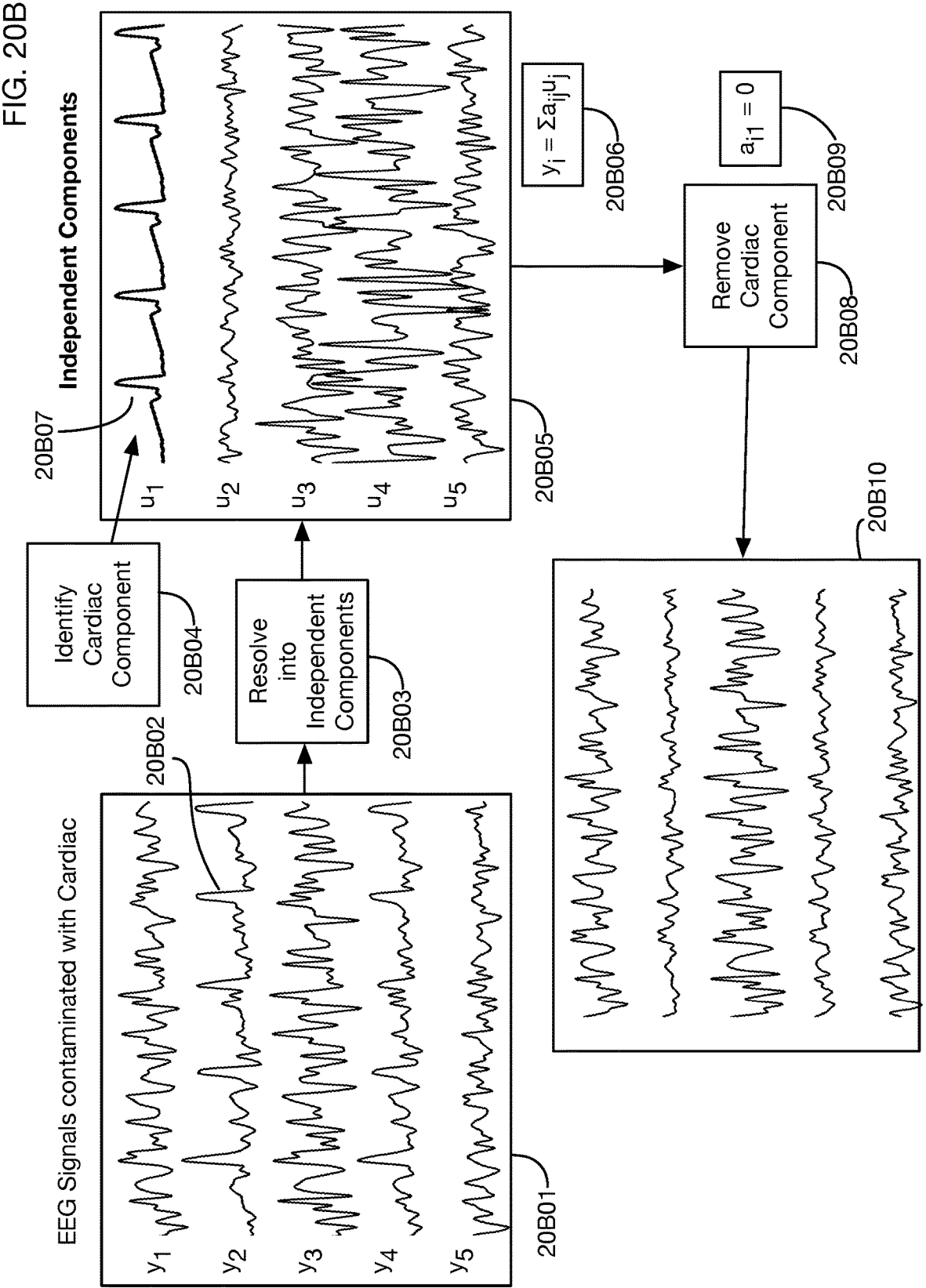

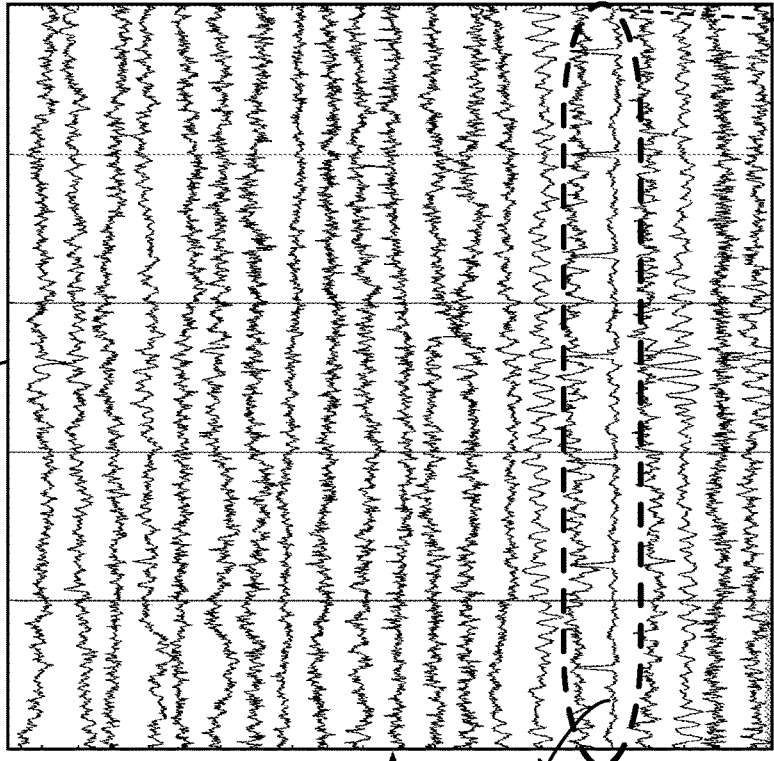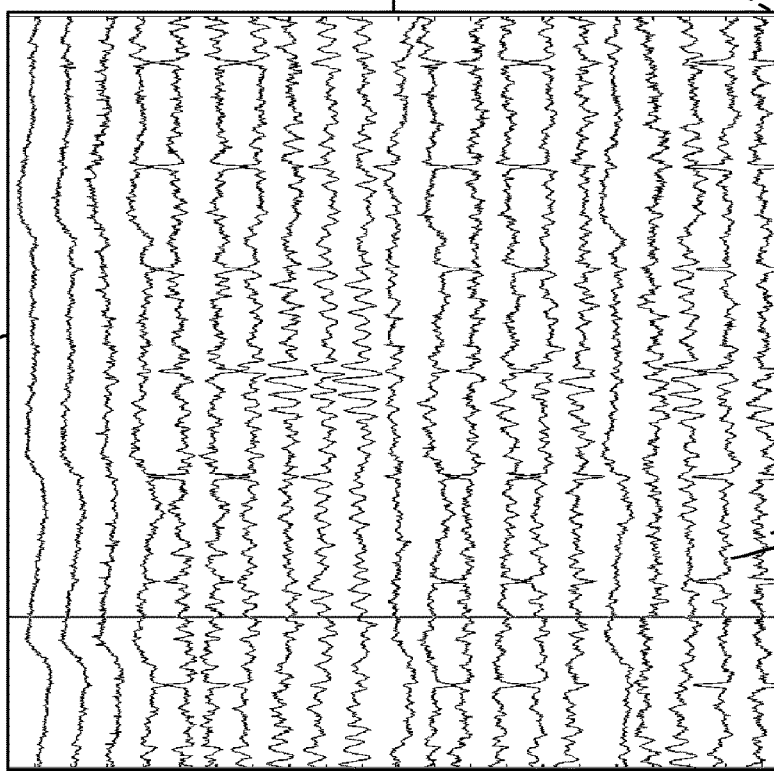

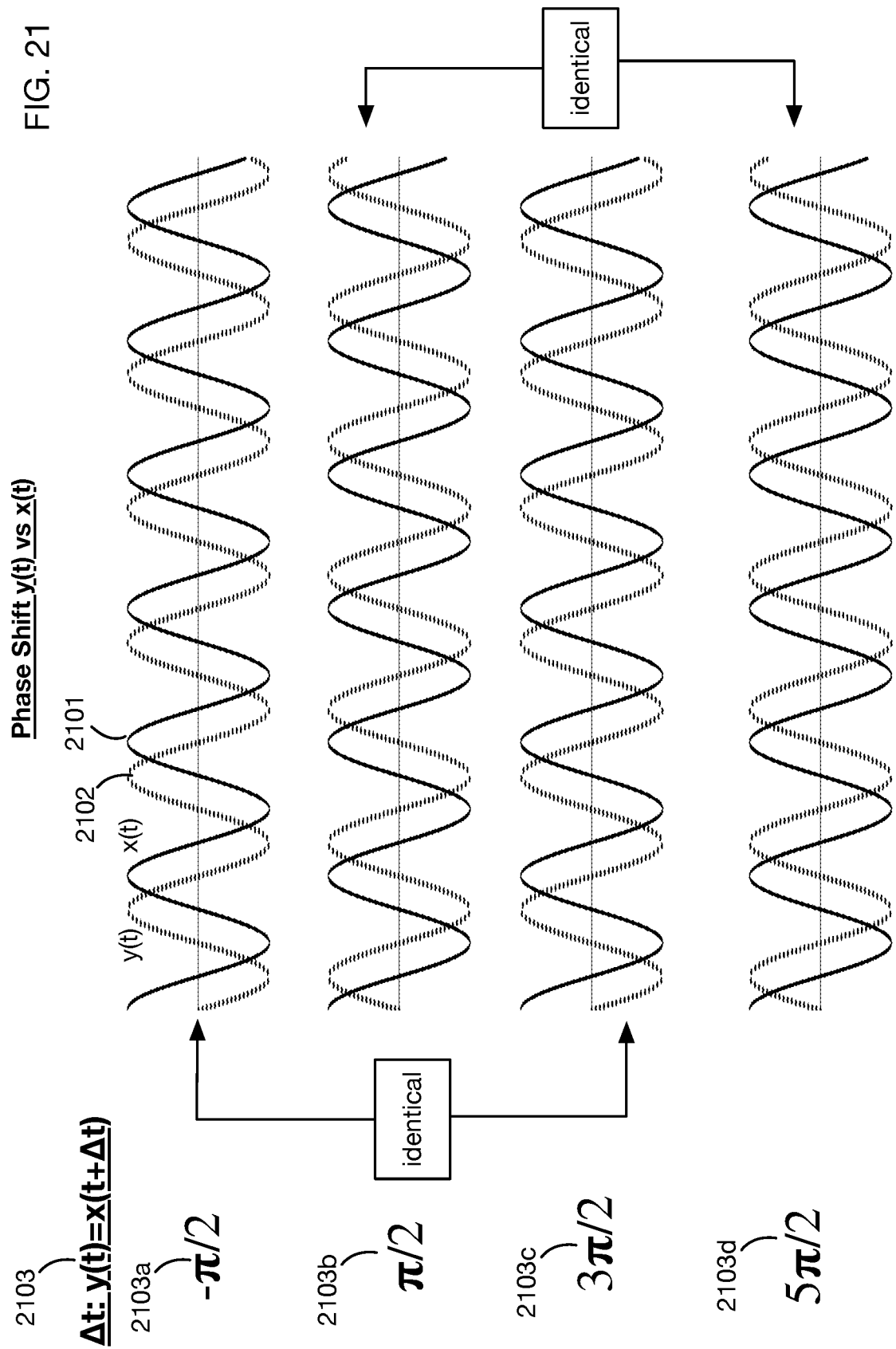

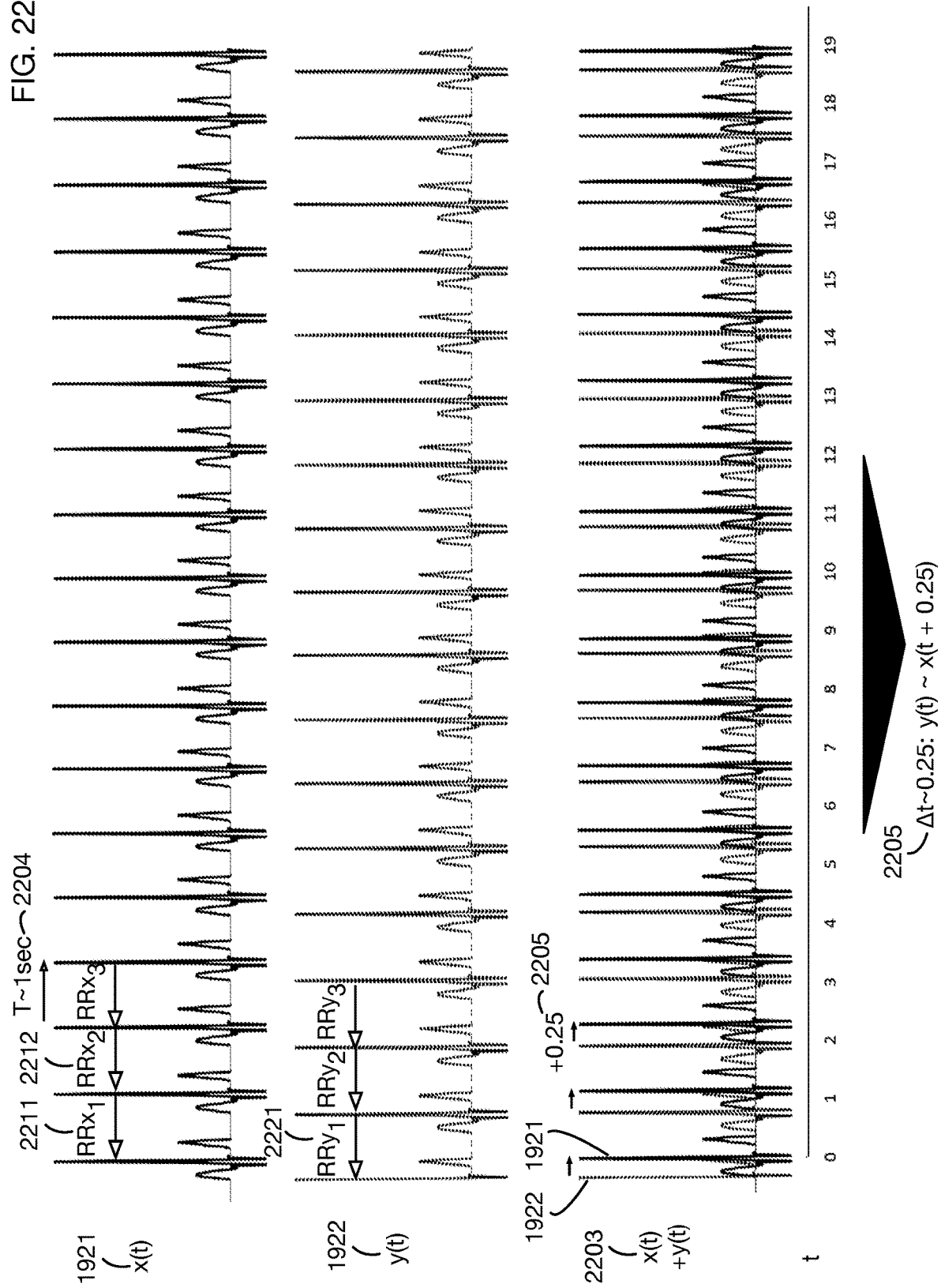

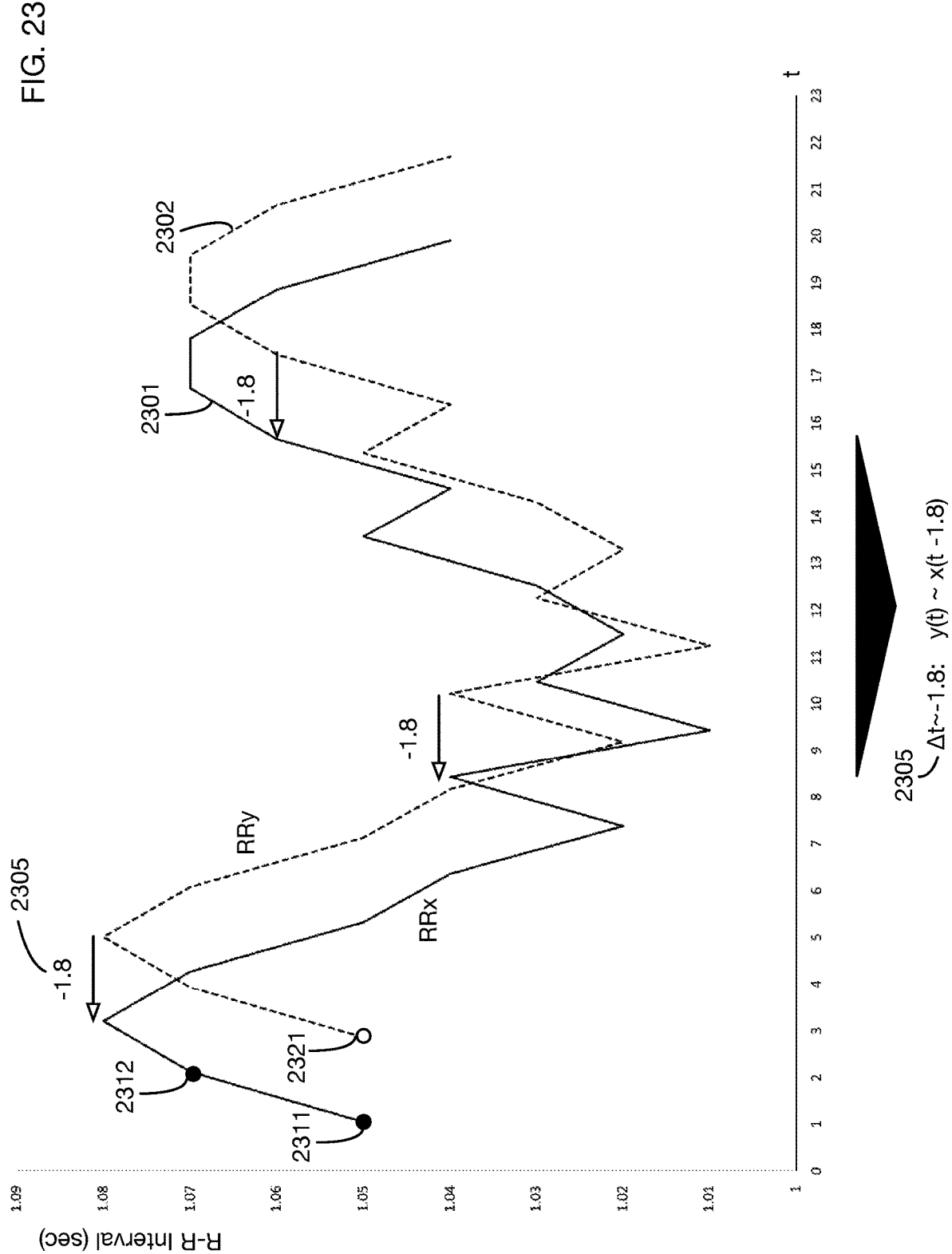

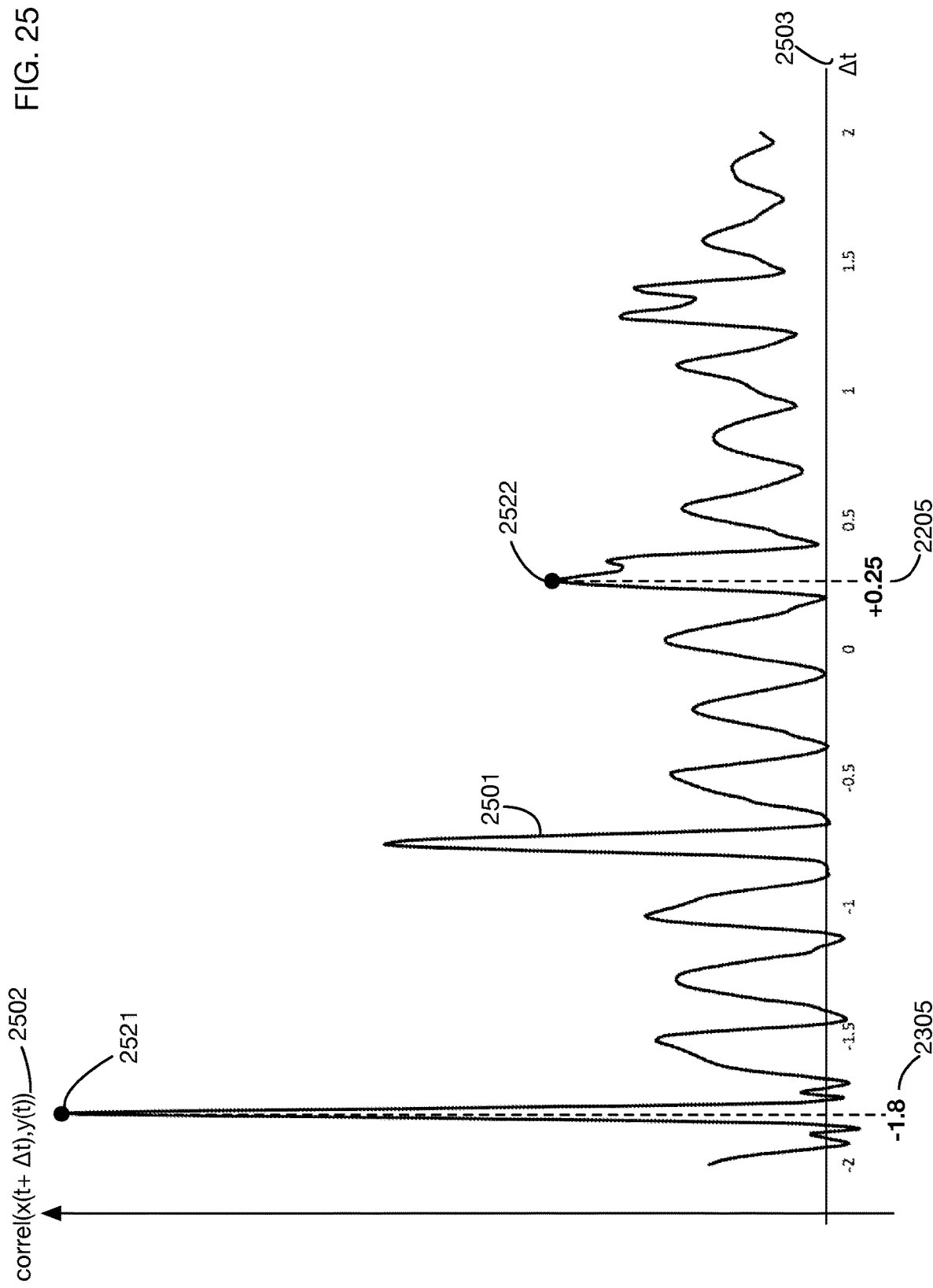

METHOD FOR SYNCHRONIZING BIOLOGICAL SIGNALS FROM DIFFERENT MONITORING DEVICES

This application is a continuation-in-part of U.S. Utility patent application Ser. No. 17/306,864, filed 3 May 2021, the specification of which is hereby incorporated herein by reference.

BACKGROUND OF THE INVENTION

Field of the Invention

One or more embodiments of the invention are related to the fields of information systems and medical devices. More particularly, but not by way of limitation, one or more embodiments of the invention enable a method for synchronizing biological signals from different monitoring devices.

Description of the Related Art

Network-enabled sensing devices are increasingly available, and offer the potential for collection and automated analysis of data streamed from these devices. In the medical field, for example, patient monitors may collect massive amounts of data at the bedside, and transmit this data to servers for analysis. The network connections between devices and servers can introduce significant and variable latencies between transmission and receipt. These latencies can cause data received from multiple sensors, either within or across devices, to drift out of synchronization. Accurate analysis may require that waveform data be synchronized after receipt to within a small number of milliseconds. There are no known systems that can achieve this degree of precise synchronization on data transmitted over networks.

Another limitation of existing systems is that patients may be monitored by multiple devices, but it is often not possible to effectively combine data from these multiple devices because the devices are not time-synchronized with sufficient precision (for example to within a few milliseconds). If it were possible to precisely time-synchronize data from multiple devices, analysis of the combined data could generate significant insights that are not available from analysis of the device data streams separately. Analysis of combined data is potentially powerful because the body's dynamic physiological systems operate together in a seamless manner to supply function, performance and health. When disease occurs, compensatory mechanisms are activated to protect vital organs and, in particular, the brain, from damage such as ischemia. In this circumstance, the variability within and between all systems is reduced as their action becomes entrained.

Consequently, evaluation, detection and prediction of health-related events could be significantly improved by combining sensor measurement data representing all significant physiological systems. In particular, combining cardiopulmonary (bedside) monitor data and neurological measurements provides a significant opportunity to improve the sensitivity of detection algorithms and the predictive capability of machine learning models. For example, integration of neurological activity and cardiorespiratory assessments may enable: detection of increased ICP pressure (via brain bleed) leading to other physiological changes; detection of asystole and vascular insufficiency, which may be manifested via ischemia and neurological impacts; detection of post cardiac arrest, with a neurological component that has a significant impact on outcomes and prognosis; and detection or prediction of various disease states such as sepsis and metabolic disorders.

In some special situations, different devices may have very precise and tightly synchronized atomic clocks, or they may be coupled to a common trigger signal generator; these solutions are expensive and complex, however, so they are not widely used. There are no known systems or methods that enable precise time-synchronization of data from multiple medical devices without these special features, for example from heart monitors and brain monitors without common trigger signals or high-precision clocks.

For at least the limitations described above there is a need for a method for synchronizing biological signals from different monitoring devices.

BRIEF SUMMARY OF THE INVENTION

One or more embodiments described in the specification are related to a method for synchronizing biological signals from different monitoring devices. Embodiments of the invention may synchronize waveform data from devices, both within and across devices, to correct for time skews introduced by network transmission latencies and clock inconsistencies among devices. In particular, one or more embodiments of the invention may enable synchronization of heart monitor data with brain monitor data, even when heart monitor and brain monitor devices operate independently without synchronized high-precision clocks.

One or more embodiments may have one or more processors connected to a network that is also connected to one or more devices. Each device may repeatedly sample data from one or more sensors over a time interval. The time interval may have multiple sampling cycles, each with a cycle duration approximately equal to the same sampling period. A device may assign a sequence number to each sampling cycle. This number may be within a range between a minimum and maximum. Sequence numbers may be incremented at each successive cycle, but when the maximum value is incremented the sequence number may rollover to the minimum value. The sequence number period is the number of distinct sequence numbers between the minimum and maximum.

A device may transmit over the network one or more packets for each sampling cycle. Each packet may contain the sequence number and data from one or more of the device's sensors. One or more receiving processors may receive the packets and add a received timestamp, to form augmented packets. The network may delay transmission of any of the packets, reorder the packets, or lose any of the packets. One or more synchronizing processors may receive the augmented packets. To synchronize these augmented packets, the synchronizing processor(s) may unwrap the sequence numbers to form unwrapped sequence numbers that uniquely identify each sampling cycle. They may then calculate a linear relationship between the unwrapped sequence numbers and the received timestamps, and apply this relationship to obtain an adjusted timestamp for each augmented packet. The packets may then be synchronized to form synchronized waveforms based on their adjusted timestamps.

In one or more embodiments, one or more of the devices may be medical devices, such as a heart monitor with sensors corresponding to the heart monitor leads.

In one or more embodiments, devices may transmit data over the network using the User Datagram Protocol.

In one or more embodiments, each sequence number may have an associated bit length, and the sequence numbers may range between 0 and two raised to the power of the bit width, minus one. The sequence number period may be two raised to the power of the bit width.

In one or more embodiments, calculation of unwrapped sequence numbers may calculate a linear mapping from received timestamps to predicted approximate unwrapped sequence numbers. The unwrapped sequence number may then be calculated as the number differing from the sequence number by an integral multiple of the sequence period, which is closest to the linear mapping applied to the received timestamp of the associated packet.

In one or more embodiments, the linear relationship between unwrapped sequence numbers and received timestamps may be calculated as a linear regression between received timestamps and unwrapped sequence numbers for the augmented packets for all of the sampling cycles.

In one or more embodiments, the linear relationship between unwrapped sequence numbers and received timestamps may be calculated as the line through the received timestamp and unwrapped sequence number of the augmented packet having the lowest received timestamp. The line may also pass through the received timestamp and unwrapped sequence number of the augmented packet having the highest received timestamp, or it may be the line with slope equal to the sampling period.

In one or more embodiments, one or more inter-device synchronizing processors may synchronize within-device synchronized waveform data across two (or more) devices. Inter-device synchronization may calculate an adjusted time bias for each device, which equals the average difference between the adjusted time and received time for the augmented packets of the device. The bias may be subtracted from the adjusted time for each device's data to synchronize the devices.

In one or more embodiments, inter-device synchronization may calculate a cross-correlation at a series of time offsets between synchronized data of one device and synchronized data of another device that is offset in time by each time offset. The phase offset may be determined as the time offset corresponding to the maximum cross-correlation. The phase offset may be subtracted from the adjusted timestamp of the data for the second device to synchronize the devices.

One or more embodiments may contain a database and one or more data storage processors that calculate an index for each augmented packet, and save the index and augmented packet data in the database. The index may be calculated by calculating a date-time prefix based on the adjusted timestamp of the augmented packet, and calculating a hash code based on or more fields of the augmented packet, and concatenating the date-time prefix and the hash code. The date-time prefix may be for example all or a portion of a POSIX time code.

One or more embodiments of the invention may enable a method for synchronizing biological signals from different monitoring devices. One or more first device signals may be obtained from a first device coupled to a patient, and one or more second device signals may be obtained from a second device coupled to the patient. A first comparable signal may be generated from the one or more first device signals, and a second comparable signal may be generated from the one or more second device signals. A first frequency variation signal may be generated from the first comparable signal, and a second frequency variation signal may be generated from the second comparable signal. A time shift applied to the first frequency variation signal may then be calculated that aligns the first frequency variation signal with the second frequency variation signal. Synchronized device signals may then be generated, which include the one or more first device signals shifted by the time shift, and the one or more second device signals.

In one or more embodiments the first frequency variation signal may include time differences between peak values in the first comparable signal, and the second frequency variation signal may include time differences between peak values in the second comparable signal.

One or more embodiments may include coupling one or more sensors of the second device to the patient in locations that are proximal to corresponding one or more sensors of the first device. The first comparable signal may be generated from data received from the corresponding one or more sensors of the first device, and the second comparable signal may be generated from the one or more sensors of the second device.

In one or more embodiments, generating the second comparable signal from the one or more second device signals may include transforming the one or more second device signals into one or more independent components, and identifying one of the one or more independent components as the second comparable signal.

In one or more embodiments, generating the second comparable signal from the one or more second device signals may include generating a matched filter based on a reference first device signal, applying the matched filter to the one or more second device signals to obtain one or more filtered signals, and calculating the second comparable signal based on the one or more filtered signals. In one or more embodiments the second comparable signal may be calculated as an average of the one or more filtered signals.

In one or more embodiments, calculating the time shift applied to the first frequency variation signal that aligns it with the second frequency variation signal may include calculating a cross correlation at a series of time offsets between the first frequency variation signal, offset in time by each time offset of the series of time offsets, and the second frequency variation signal. The time shift may be calculated as the time offset corresponding to a maximum value of the cross correlation.

In one or more embodiments of the invention, the first device may include a heart monitor, the one or more first device signals may include one or more heart monitor signals, the second device may include a brain monitor, the one or more second device signals may include one or more brain monitor signals, the first comparable signal may include a first heart activity signal, and the second comparable signal may include a second heart activity signal.

In one or more embodiments the first frequency variation signal may include a first RR-interval signal with time differences between peaks of R-waves of the first heart activity signal, and the second frequency variation signal may include a second RR-interval signal with time differences between peaks of R-waves of the second heart activity signal.

One or more embodiments of the invention may include coupling one or more electrodes of the brain monitor to the patient in locations proximal to corresponding one or more electrodes of the heart monitor, generating the first heart activity signal from data received from the corresponding one or more electrodes of the heart monitor, and generating the second heart activity signal from data received from the one or more electrodes of the brain monitor.

In one or more embodiments of the invention, generating the second comparable signal from the one or more second device signals may include transforming the one or more brain monitor signals into one or more independent components, and identify one of the one or more independent components as the second heart activity signal.

In one or more embodiments of the invention, generating the second comparable signal from the one or more second device signals may include generating a matched filter based on a reference cardiac signal, applying the matched filter to the one or more brain monitor signals to obtain one or more filtered signals, and calculating the second heart activity signal based on the one or more filtered signals. In one or more embodiments the second heart activity signal may be calculated as an average of the one or more filtered signals.

In one or more embodiments of the invention, calculating the time shift applied to the first frequency variation signals that aligns it with the second frequency variation signal may include calculating a cross correlation at a series of time offsets between the first RR interval signal, offset in time by each time offset in the series of time offsets, and the second RR interval signal. The time shift may be calculated as the time offset corresponding to a maximum value of the cross correlation.

BRIEF DESCRIPTION OF THE DRAWINGS

The above and other aspects, features and advantages of the invention will be more apparent from the following more particular description thereof, presented in conjunction with the following drawings wherein:

FIG. 9B shows use of the adjusted time to synchronize waveforms.

FIG. 11 illustrates one method that may be used to synchronize waveforms across devices, which adjusts times so that the average adjusted time equals the average received time.

FIGS. 20A through 20E show illustrative filtering techniques that can be applied to EEG signals to extract a cardiac signal, which may then be synchronized with signals from a heart monitor; similar filtering techniques may be applied to signals from any type of device to extract a comparable signal that can be synchronized with a comparable signal from another device FIG. 20A illustrates how electrodes from a brain monitor may detect heart signals as well as brain signals.

FIG. 20B shows an illustrative technique of resolving signals into independent components, one of which may correspond to a cardiac signal.

FIG. 20C illustrates application of the independent components decomposition of FIG. 20B to actual EEG signals.

FIG. 20D shows a different technique to extract a cardiac signal from EEG signals by applying a matched filter based on a reference ECG signal.

FIG. 20E illustrates application of the matched filter technique of FIG. 20D to an actual EEG signal.

FIG. 21 illustrates a challenge in synchronizing signals that are periodic: time offsets between signals that differ by a multiple of the signal period may be indistinguishable; biological signals that are almost periodic therefore may require special methods for synchronization.

FIG. 22 illustrates the phenomenon of FIG. 21 with signals from a heart monitor and a brain monitor, both of which measure heart activity; because these signals are almost periodic, they can be approximately aligned with many different time offsets.

FIG. 23 illustrates a method used in one or more embodiments of the invention to transform the almost-periodic signals into signals of frequency variation, such as time differences between peak values (such as RR-interval signals for cardiac waveforms), that are not periodic.

FIG. 25 illustrates calculation of the time offset between signals using correlation between the original signals, rather than between the RR-intervals as in FIG. 24; this correlation shows the multiple local maxima resulting from the almost periodic original signals.

DETAILED DESCRIPTION OF THE INVENTION

A method of synchronizing biological signals from different monitoring devices will now be described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
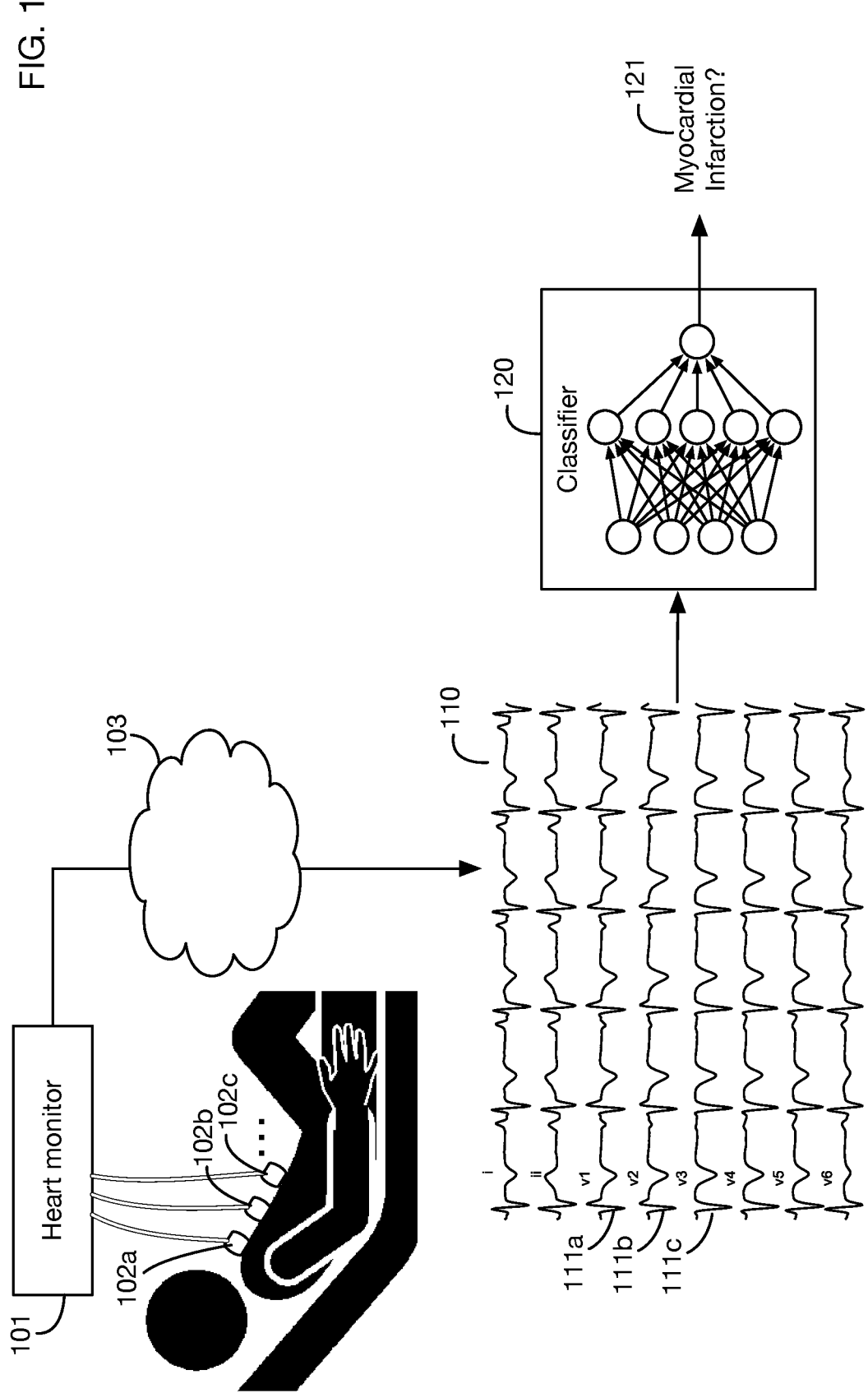
FIG. 1 shows an illustrative problem addressed by one or more embodiments of the invention: multiple waveforms are captured from a device such as a heart rate monitor, and these waveforms are input into a classifier to determine whether an event such as a myocardial infarction has occurred.

Waveform data requires time phase alignment at millisecond accuracy to be suitable for data analysis. An illustrative analysis of waveforms from a multi-channel heart monitor 101 is shown in FIG. 1. Heart monitor 101 collects data from the sensor attached to the patient; three illustrative sensors 102a, 102b, and 102c are shown. The heart monitor itself may for example be at the patient's bedside. Waveform data 110 may be transmitted from heart monitor 101 to one or more other systems for analysis, over a network or networks 103. The system or systems that analyze waveform data may for example be hospital servers, cloud-based resources, or any type of processor or processors. Data may be transmitted in a live stream from the heart monitor so that analysis can be performed soon after data arrives. Waveform data 110 contains for example waveform 111a corresponding to readings from sensor 102a, waveform 111b corresponding to readings from sensor 102b, and waveform 111c corresponding to readings from sensor 102c. Waveforms 110 may for example be analyzed by a classifier 120 that determines whether the patient is experiencing a myocardial infarction 121. (This analysis is illustrative; one or more embodiments may perform any types of analyses on any types of waveform data from any types of devices.) The classifier 120 may for example use a neural network, or any other type of classification technology.

Figure 2:
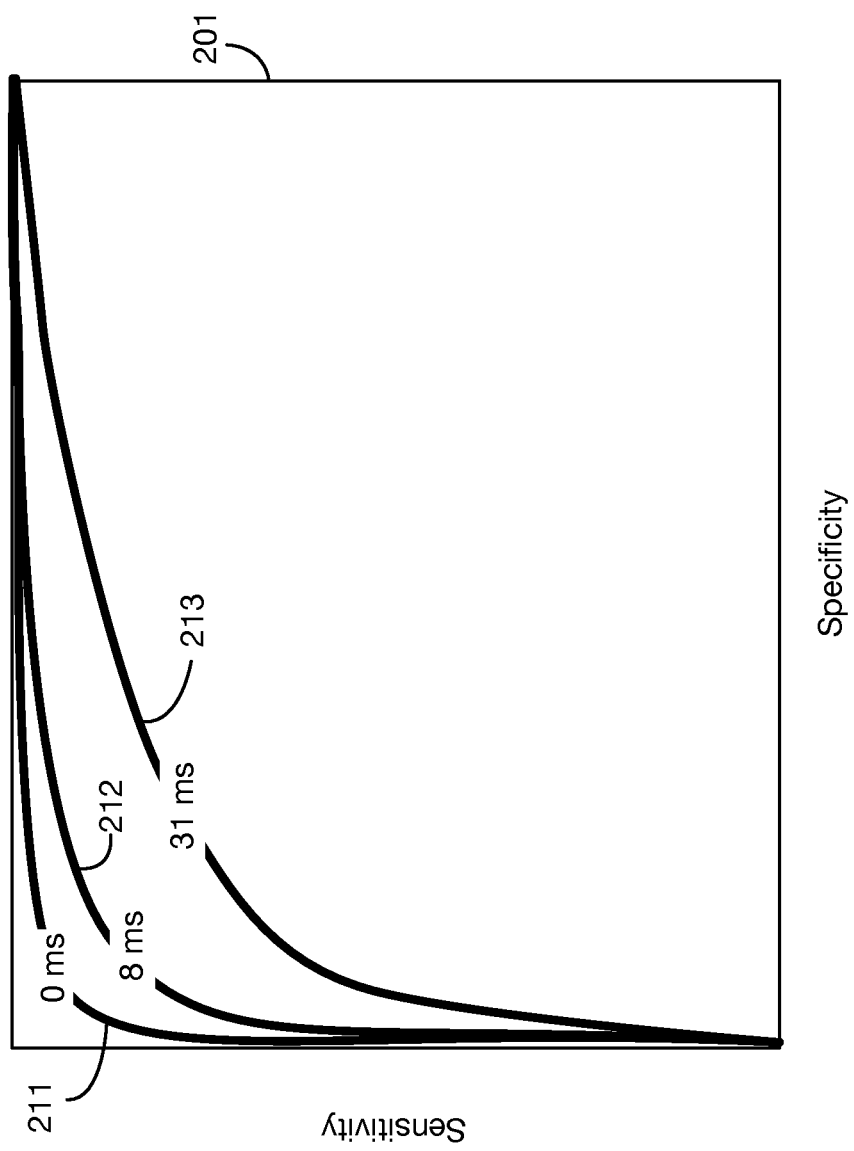
FIG. 2 continues the example of FIG. 1 to show that that time misalignment between the waveforms can dramatically reduce the classifier performance; accurate synchronization of waveforms to within a very small number of milliseconds is therefore critical.

A challenge for the analysis illustrated in FIG. 1 is that transmission of sample data from device 101 over network 103 may cause misalignment of some or all of the waveforms. Packets sent over network 103 may be subject to variable and unpredictable delays, which can cause waveforms to be out of synchronization. Small misalignments among waveforms of even several milliseconds can dramatically reduce the performance of classifier 120 or similar analysis algorithms. This situation is illustrated in FIG. 2, which shows the results of experiments performed by the inventors to test the effect of different amounts of waveform misalignment on performance of the myocardial infarction classifier 120. Plots 201 show receiver operating characteristic (ROC) curves for classifier 120 with three different amounts of waveform misalignment: curve 211 show the ROC curve for no misalignment; curve 212 shows the ROC curve for 8 milliseconds of misalignment; and curve 213 shows the ROC curve for 31 milliseconds of misalignment. These results illustrate that millisecond-level waveform alignment is critical for maximum performance of the analysis algorithm.

Figure 3:
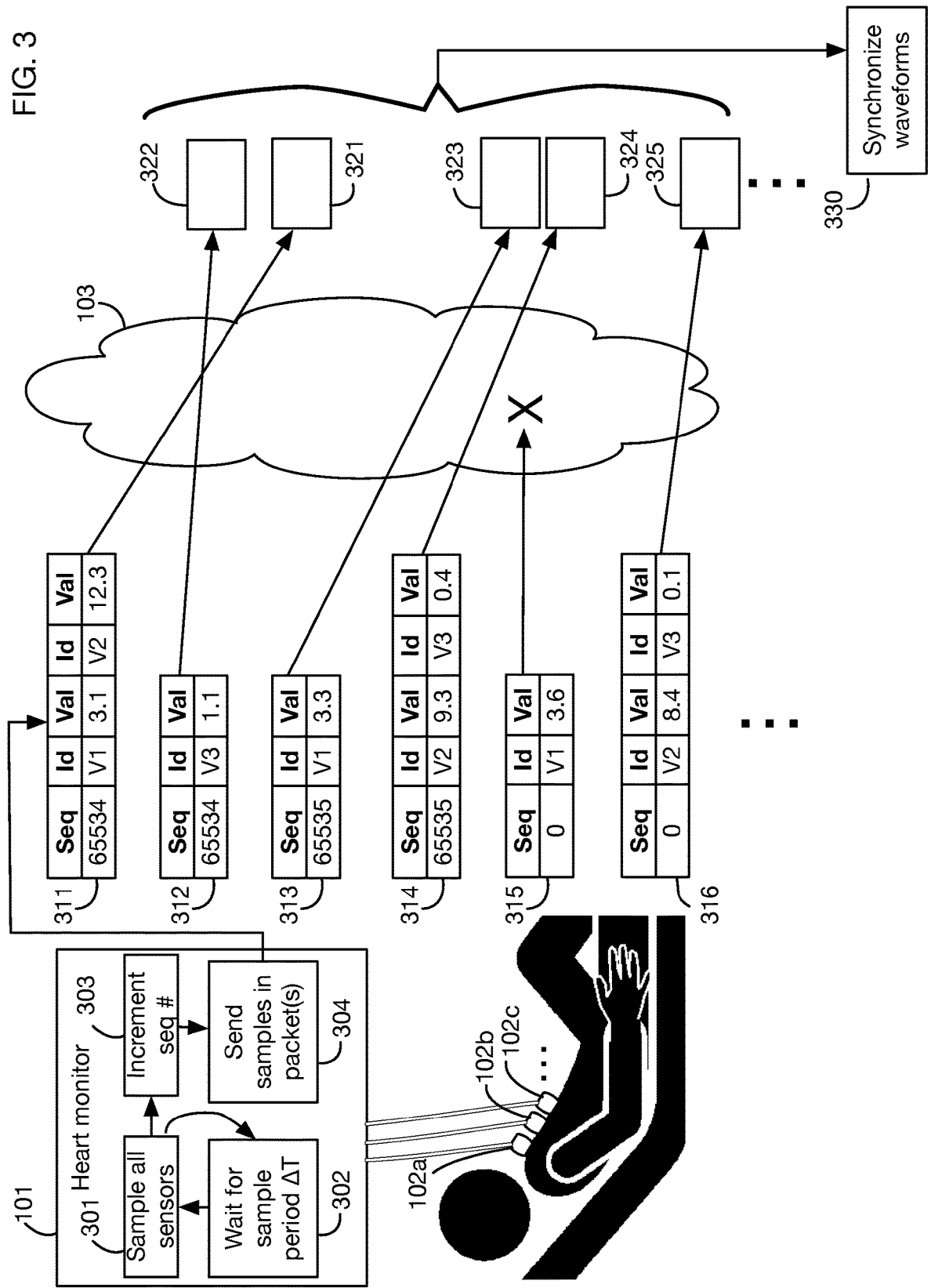
FIG. 3 shows transmission and receipt of illustrative packets containing waveform data; because the network transport carrying the datagrams may be connectionless, packets can be delayed, reordered, or lost.

FIG. 3 shows an example of data transmission from device 101 through network 103, illustrating the potential challenges in aligning waveforms after receiving the transmissions. Device 101 performs a sampling loop to sample all of its sensors at a regular sampling period, which may be for example 256 milliseconds for a heart monitor. Each sampling cycle has a duration of approximately the same sampling period. This sampling continues periodically over a time interval, which may be seconds, minutes, hours, or days. Sampling step 301 collects data from each sensor in the device (for example by polling each sensor and digitizing the sensor's analog value); sampling then waits in step 302 before sampling again after the sampling period has elapsed. This loop occurs repeatedly while the monitor is running. For each sample (of all sensors), the monitor performs an increment 303 of an internal sequence number, which is used to tag the transmitted samples (as described below). This sequence number may be a fixed number of bits (such as 16 bits, for example), and may rollover when the maximum sequence number value is reached. The sequence number may rollover to the minimum value. For example, with a bit length of k bits, treated as an unsigned integer, the minimum sequence number is 0, the maximum sequence number is $2^k-1$, and there are $2^k$ distinct sequence numbers. When the device increments the maximum sequence number $2^k-1$, the sequence number rolls over to 0. Sequence numbers therefore may not uniquely identify a sample. The samples collected in sampling step 301, and the sequence number generated by increment 303, are then transmitted over network (or networks) 103 in step 304. The collection of samples from all sensors (for a single sampling cycle) may not necessarily all be sent in the same packet.

FIG. 3 shows illustrative packets 311 through 316 that may be sent successively from device 101 over network 103. For ease of exposition, these illustrative packets show only data from 3 sensors 102a, 102b, and 102c; in practice any number of sensors may be associated with a device. Each sensor is assigned an identifier; thus sensor 102a may correspond to heart monitor lead "V1", sensor 102b may correspond to heart monitor lead "V2", and sensor 102c may correspond to heart monitor lead "V3". During the initial sampling cycle, sequence number 65534 is assigned, and values 3.1, 12.3, and 1.1 are read from sensors 102a, 102b, and 102c, respectively. The first packet 311 transmitted contains the sequence number and the values for sensors 102a and 102b; the second packet 312 contains the sequence number and the values for sensor 102c. In the next sampling cycle, the sequence number is incremented to 65535, and values 3.3, 9.3, and 0.4 are read. Packet 313 is sent with the sequence number and the value from sensor 102a, and then packet 314 is sent with the sequence number and the value from sensors 102b and 102c. In the third sampling cycle, values 3.6, 8.4, and 0.1 are read, and the sequence number is incremented but it rolls over to 0 (with a 16 bit sequence number). Packet 315 is sent with the sequence number and the value from sensor 102*a*, and then packet 316 is sent with the sequence number and the values from sensors 102*b* and 102*c*.

Network 103 may provide any type or types of transmission of packets 311 through 316 to a receiving system or systems. In one or more embodiments, transmission may be unreliable and subject to issues such as packet loss, packet reordering, and variable and unpredictable packet delays before delivery. These issues may occur for example when a connectionless transport layer such as UDP (User Datagram Protocol) is used to send packets. FIG. 3 illustrates some of the situations that may occur with packet transmission. Packet 311 is sent before packet 312, but packet 312 arrives first. Packet 313 arrives after a long delay, and then packet 314 arrives very shortly thereafter. Packet 315 is lost.

The received packets 322, 321, 323, 324, and 325 are then processed by one or more receiving systems. Some of this processing may require a synchronization process 330 of the waveforms. This synchronization 330 may be performed by one or more synchronizing processors that may receive packets over one or more network connections. This synchronization cannot simply use the received time of packets directly because of the variable packet delays, reorderings, and losses described above. A system and method to synchronize waveforms that accounts for these transmission issues is described below.

Figure 4:
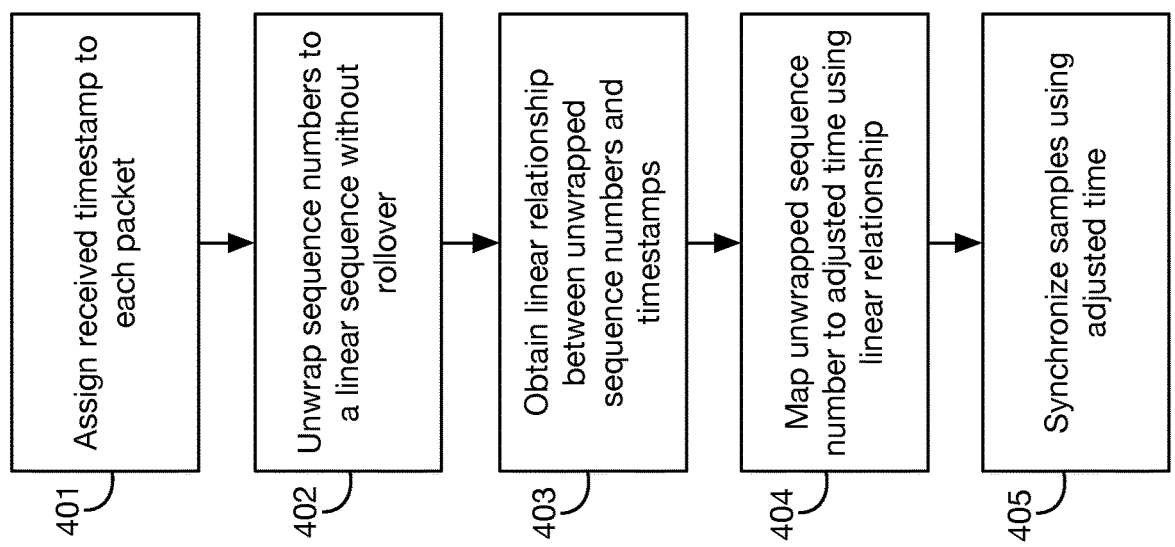
FIG. 4 shows an illustrative flowchart of steps that may be used in one or more embodiments of the invention to synchronize waveforms.

FIG. 4 shows a flowchart of illustrative steps that may be used in one or more embodiments to generate synchronized waveforms from the packets received from a device. In step 401, a receiving system assigns a received timestamp to each packet. In step 402, the sequence numbers in the packets are "unwrapped" to undo the effects of rollover: the unwrapped sequence numbers will form a linear sequence with no rollovers. In step 403, a linear relationship is obtained between the unwrapped sequence numbers and the received timestamps assigned in step 401. In step 404, this linear relationship is used to map the unwrapped sequence numbers to an adjusted time. Finally in step 405, the waveforms are synchronized using the adjusted times. These steps are described in greater detail below.

Figure 5:
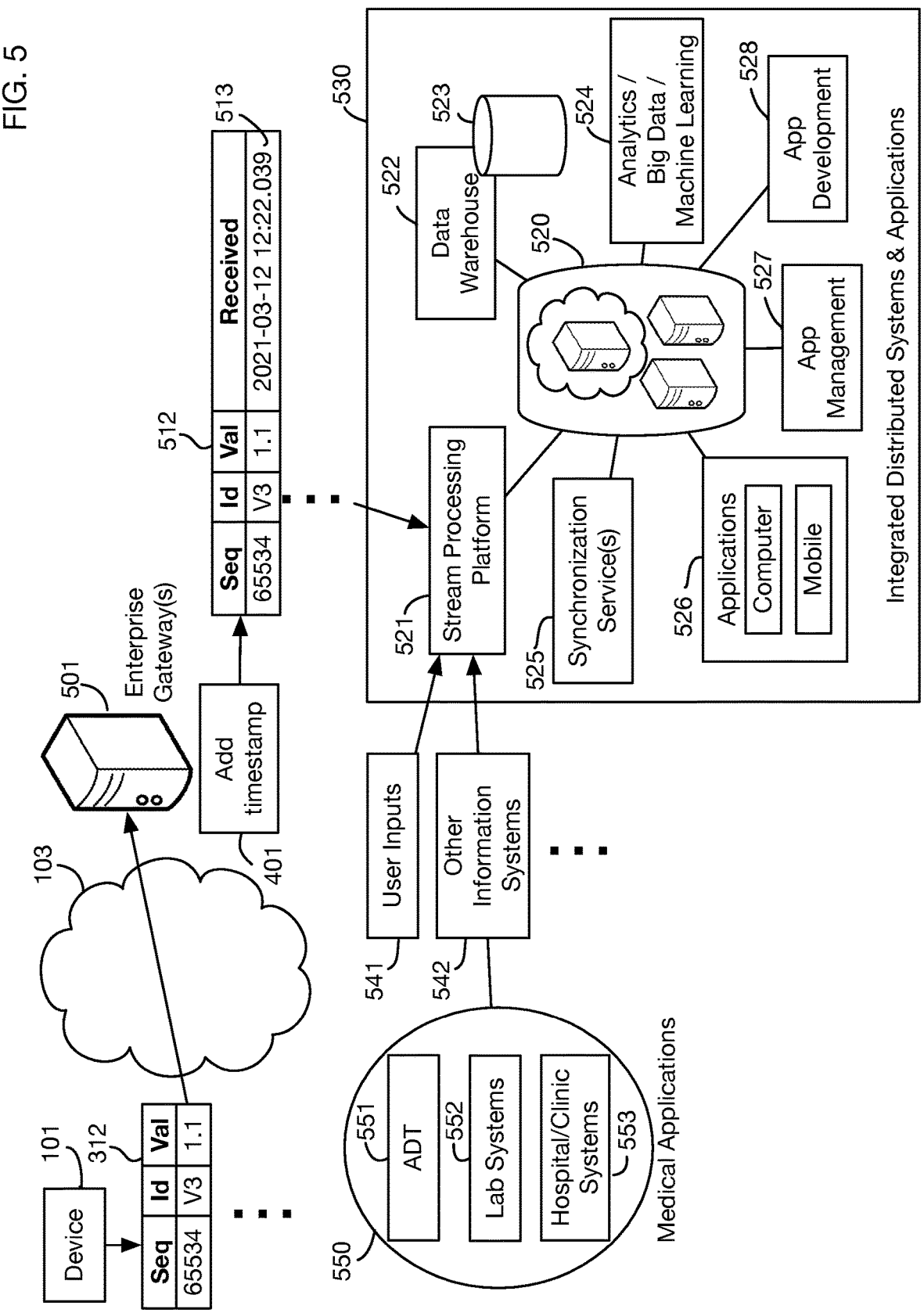
FIG. 5 shows an illustrative architecture of software and hardware components that may be used in one or more embodiments of the invention to receive, store, and process waveform data and other information.

FIG. 5 shows an illustrative architecture of hardware and software components that may receive, store, or process waveform data or other information, and that may incorporate some or all of the synchronization steps described in FIG. 4. Packets such as packet 312 sent from device 101 over network or networks 103 may be received by one or more receiving processors 501, which may be for example an enterprise gateway or similar system. (Other systems or nodes may receive and forward packets before packets reach this system 501.) This system 501 performs timestamping step 401 to add a timestamp to each received packet corresponding to the system clock when the packet is received and processed. In one or more embodiments, multiple receiving processors 501 may receive and process packets. The clocks of the receiving system or systems may be synchronized for example using NTP (network time protocol).

Timestamping step 401 transforms packet 312 to augmented packet 512, which contains the same data as packet 312 as well as the timestamp 513 of when the packet was received by system(s) 501. The stream of augmented (timestamped) packets such as 512 may then be transmitted to system 530, which may for example be an integrated, interconnected, and potentially distributed collection of processors, applications, and storage subsystems. Timestamped packets such as packet 512 may be streamed to a stream processing platform 521, or a distributed set of stream processing platforms, which may transform or forward streams to other system components. In one or more embodiments, other data in addition to waveform data may also be streamed or otherwise transferred to system 530, such as data from other information systems 542 and user inputs 541. For example, in a medical application, information systems 550 that may be connected to system 530 may include systems such as ADT (admission, discharge, and transfer) systems 551, laboratory systems 552, and hospital or clinic information systems 553.

The applications and data storage subsystems integrated into system 530 may be executed or managed by one or more processors 520, which may include the receiving system(s) 501 as well as any other servers or other computers. Any of these systems may be or may have any type or types of processors, including for example, without limitation, desktop computers, laptop computers, notebook computers, CPUs, GPUs, tablet computers, smart phones, servers, customized digital or analog circuits, or networks of any of these processors. Some or all of these systems may be remote from the site housing device 101. Some or all of the systems may be cloud-based resources, such as for example AWS® servers or databases. Data and processing may be distributed among the processors 520 in any desired manner. Illustrative embodiments of system 530 may include any number of stream processing components such as AWS Kinesis® or Apache KAFKA® with KSQL® or SPARK®, database components, computational components, data warehouse, data lake or data hub components, analytics components, and applications components. Applications may be managed by an application management subsystem 527, which may for example manage deployment, distribution of processing across processors, and data interconnections among components. An application development platform 528 may also be connected to the other components of system 530, so that new or modified applications can access streams, data, and component outputs for development and testing.

The stream processing platform 521 (which may be a distributed network of stream processing systems) may provide immediate access to received packets by applications that are part of or connected to system 530. For example, in a medical embodiment these applications may include algorithms for detecting and predicting cardiac arrhythmia, physiological decompensation and diverse types, cardiac and respiratory events, inadequate blood pressure and/or blood oxygen and glycemic instability. System 530 may utilize waveform data to inform clinicians, extract features indicative of patient physiological state (such as heart rate variability), support predictive applications, enable application development, and display results at local and remote locations.

As described for example with respect to FIGS. 1 and 2, accurate results may necessitate waveform alignment which may be performed by synchronization service(s) 525 as packets are received by the stream processing engine 521.

Data received by stream processing platform 521, or from other sources or subsystems, may be stored in one more databases or other storage systems 523, which may implement or connect to data warehouses, data lakes, or data hubs 522. System 530 may provide access to data stored in any database, data warehouse, data lake, or data hub, to applications 526, which may include computer-based applications and mobile apps. Stored data or directly streamed data may also be processed by analytical systems 524, which may for example include machine learning and big data analytics. In medical applications, data may be processed in bulk to provide representative data sets for determining models capable of detecting and predicting clinical conditions and events and patient state, such as the myocardial infarction classifier 120 described with respect to FIG. 1. Analytics 524 and applications 526 may require synchronization of waveform data; synchronization services 525 may perform this synchronization before storage, upon retrieval from storage, or on streamed data as it is received. A user or subsystem may for example request synchronization of waveforms for a specific patient or for multiple patients over a particular time interval or intervals.

System 530 may also provide application access to data stored in the database, data warehouse, data lake and/or data hub for user consumption for offline viewing, reporting, annotation and chart review. Here, synchronization 525 may be applied to waveform either prior to insertion into the database or data warehouse or after querying for the desired data subset.

In summary, synchronization services 525 may be applied to incoming streams received by stream processing platform 521, or to data stored in subsystems 523 and 522, either before or after storage. Appropriate synchronization of waveform data may be critical to accurate analysis and display by analytics 524 and applications 526.

Figure 6:
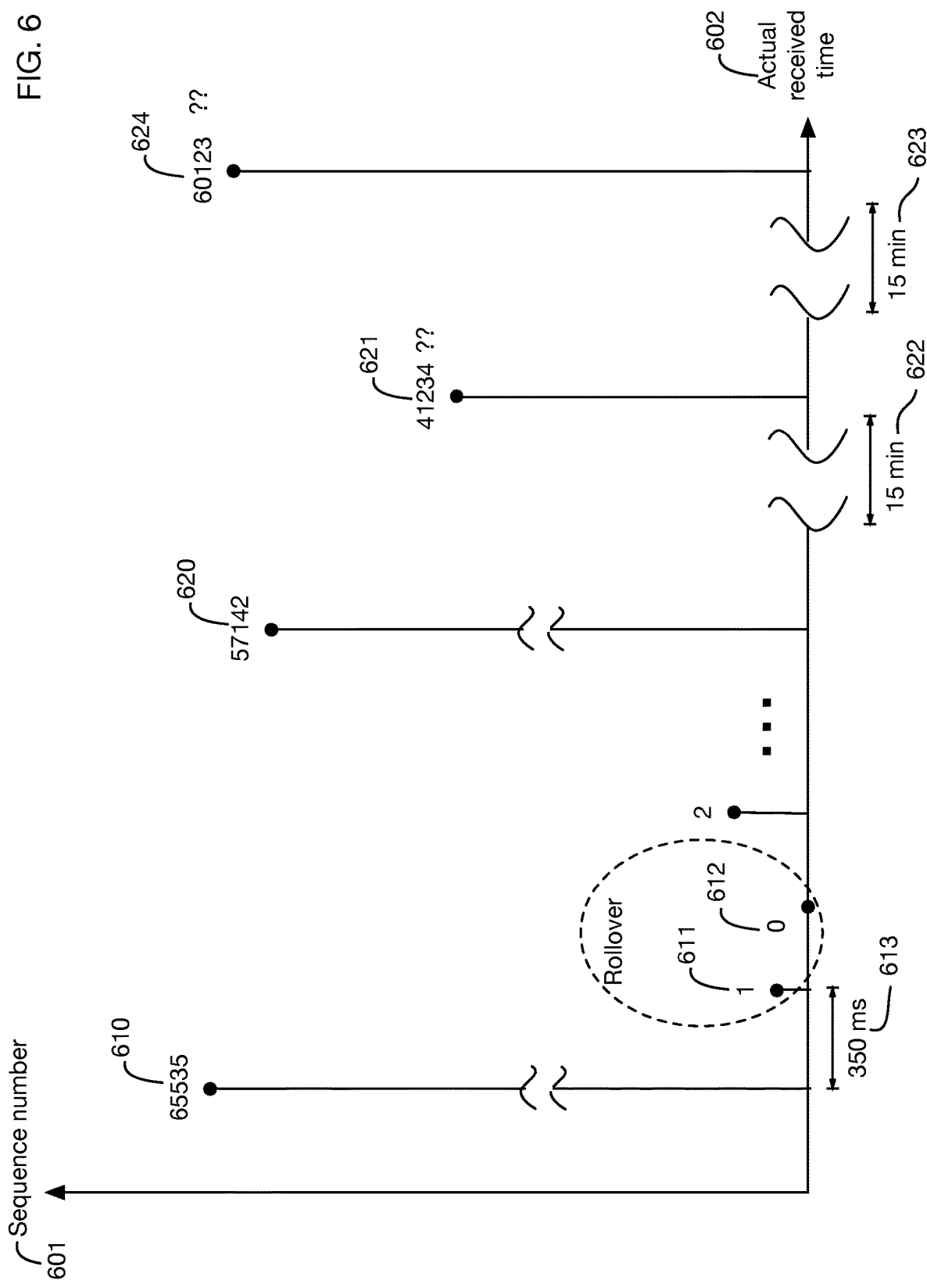
FIG. 6 illustrates the issue of rollover of sequence numbers in transmitted packets, and the particular challenge of unwrapping sequence numbers after long delays between packets.
Figure 7:
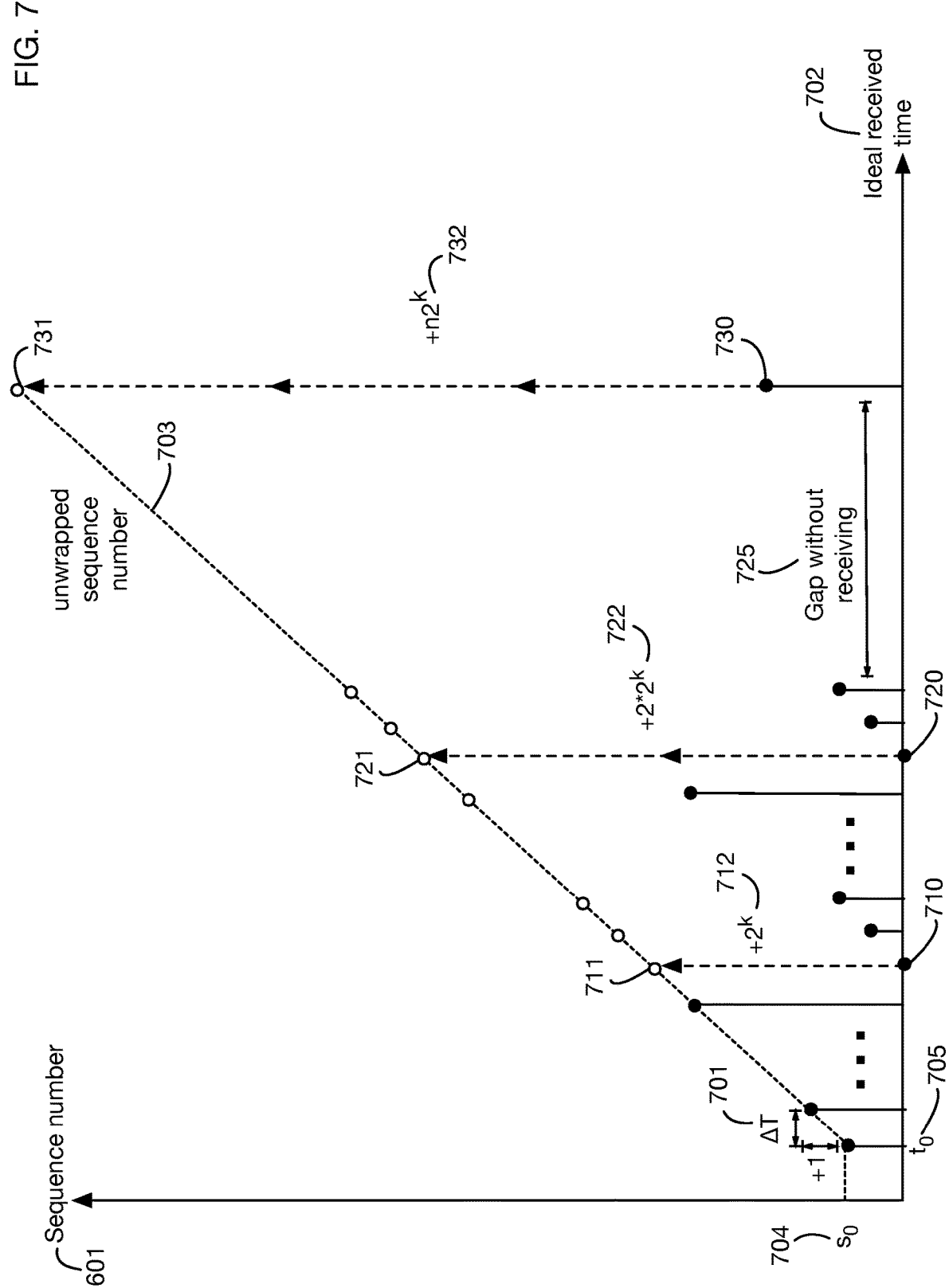
FIG. 7 illustrates how unwrapped sequence numbers are correlated with the received time of packets.
Figure 8:
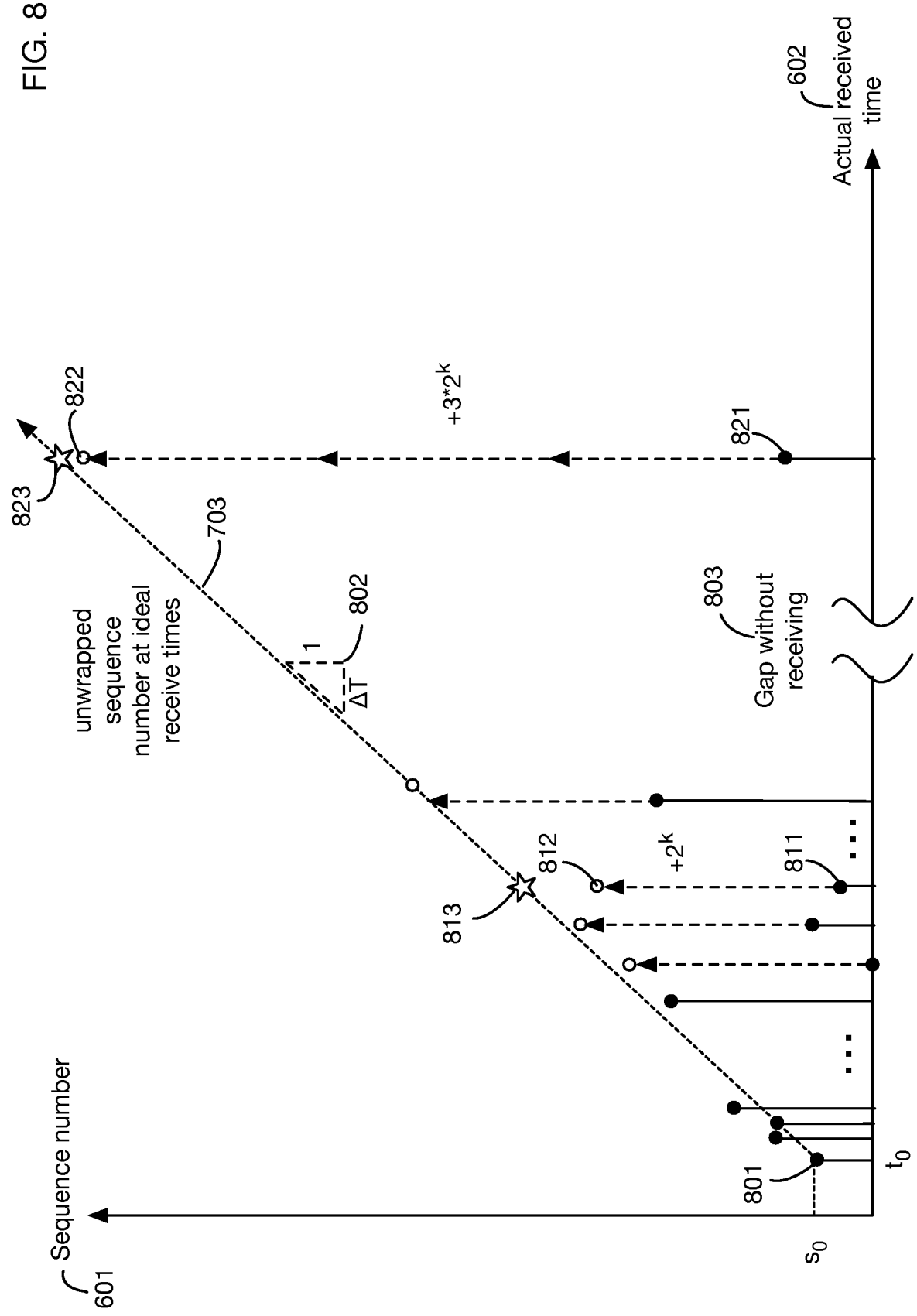
FIG. 8 illustrates a method that may be used to unwrap sequence numbers that adds an integral multiple of the sequence number period to each wrapped sequence number to get close to a linear curve based on the received time.

We now describe an illustrative procedure that may be used in one or more embodiments to perform synchronization 525 on waveform data that has been received and timestamped. FIGS. 6, 7, and 8 illustrate an approach to step 402, unwrapping of sequence numbers. The objective of this step is to assign a unique unwrapped sequence number to every sampling cycle in the device, and to undo the effect of potential wraparound of sequence numbers due to the finite and fixed bit length of a sequence number field. The unwrapped sequence numbers may then be used for synchronization, as described below.

If packets were always received reliably and in order, with no gaps, unwrapping sequence numbers would be straightforward. For example, with a 16-bit sequence number (treated as an unsigned integer), the maximum sequence number would be 65535, and the following sequence number would be 0 (the minimum sequence number value). This would indicate that a wraparound has occurred, and the unwrapped sequence number could simply be set to 65536. After a single wraparound, the unwrapped sequence number is the sum of the wrapped sequence number and the sequence number "period", which is equal to the number of distinct wrapped sequence numbers. This sequence number period is $2^k$ for a sequence number of k bits. However, because packet delivery can be unreliable, with reordering, loss, and unpredictably long delays, unwrapping of sequence number is more complex. FIG. 6 illustrates the potential challenge. The chart shows the sequence number 601 of received packets as a function of the received timestamp 602. A 16 bit sequence number is used for illustration; similar issues and techniques may apply to sequence numbers of any length. This example also assumes that the sampling period for the transmitting device is 256 milliseconds. The first packet received 610 has sequence number 65535, which is the maximum value for a 16 bit unsigned integer. After a delay 613, a second packet 611 is received with sequence number 1. Because the delay 613 is of the same order of magnitude as the device's sampling period, it is almost certain that a rollover has occurred in the sequence numbers. Sequence number 1 can therefore be mapped to unwrapped sequence number 65537. Similarly the next packet received 612 has sequence number 0, which almost certainly indicates the rollover happened after packet 610. In this case, packets 611 and 612 were reordered in transport, but it is straightforward to detect and compensate for the rollover, by mapping 1 to 65537, and 0 to 65536. A more complex scenario occurs after packet 620, when a long delay 622 passes before the next packet 621 is received. In this situation it is not apparent whether packet 621 indicates a rollover, a late packet without rollover, or possibly multiple rollovers. In another scenario, another long delay 623 passes between receipt of packet 621 and the next packet 624. In this scenario, the sequence number of packet 624 is greater than that of packet 621, but it is not clear from the sequence numbers alone whether a rollover may have occurred between these two packets.

FIGS. 7 and 8 show a procedure that may be used to determine the unwrapped sequence number for any packet, even with issues such as those described above. FIG. 7 shows a simplified scenario, and FIG. 8 describes the complete solution. In the (artificial) example shown in FIG. 7, perfect network transmission is assumed where all packets are delivered in order with a fixed delay. This example also shows only a single packet per sequence number. In this simplified scenario, a new packet arrives after every time interval 701 that is equal to the device polling period (such as 256 milliseconds). The unwrapped sequence number can therefore be predicted perfectly from the (ideal) received time 702 of the packet. A line 703 mapping the received time 702 into the unwrapped sequence number can be generated by starting at the first point at received time 705 and received sequence number 704, where the line has slope $1/\Delta T$, where $\Delta T$ is the sampling period 701 of the device. Using this line, packet received times can be used to unambiguously determine the unwrapped sequence number. For example, received packet 710, with sequence number 0, can be mapped to unwrapped sequence number 711; the unwrapped sequence number is exactly a power of two 712 (corresponding to the sequence number period $2^k$ for a sequence number of k bits). At the next rollover, received packet 720 can be mapped to unwrapped sequence number 721, which is an offset 722 of a multiple of the sequence number period. Even if a gap 725 occurs, a subsequent received packet 730 can be mapped to unwrapped sequence number 731 based on the received timestamp.

FIG. 8 presents a more realistic example, wherein packets can be reordered, lost, or delayed by arbitrary amounts. The same procedure described with respect to FIG. 7 can be used to generate line 703 through the initial point 801 with slope 802, which maps received time 602 of each packet into an unwrapped sequence number. This mapping may not be exact, since packet receive times are not completely regular. However, it can be used to obtain a predicated approximate unwrapped sequence number, which can then be adjusted. For example, point 811 can be mapped to predicted approximate unwrapped sequence number 813 on line 703 using the packet's received timestamp. This unwrapped sequence number 813 cannot be exactly correct, because it does not differ from the wrapped sequence number by a multiple of the sequence number period. The point 812 differs from point 811 by the sequence number period ($2^k$), and it is relatively close to line 703; therefore this point 812 is the correct unwrapped sequence number.

Similarly even after a long gap 803 without packets, a packet 821 can be mapped to a predicated approximate unwrapped sequence number 823 based on the received timestamp of the packet. This value can then be adjusted to value 822, which differs from the wrapped sequence number an integral multiple of sequence number period. This procedure can be applied in general: the unwrapped sequence number can be determined as the value differing from the wrapped sequence number by an integral multiple of the sequence number period that is closest to the line 703.

Figure 9A:
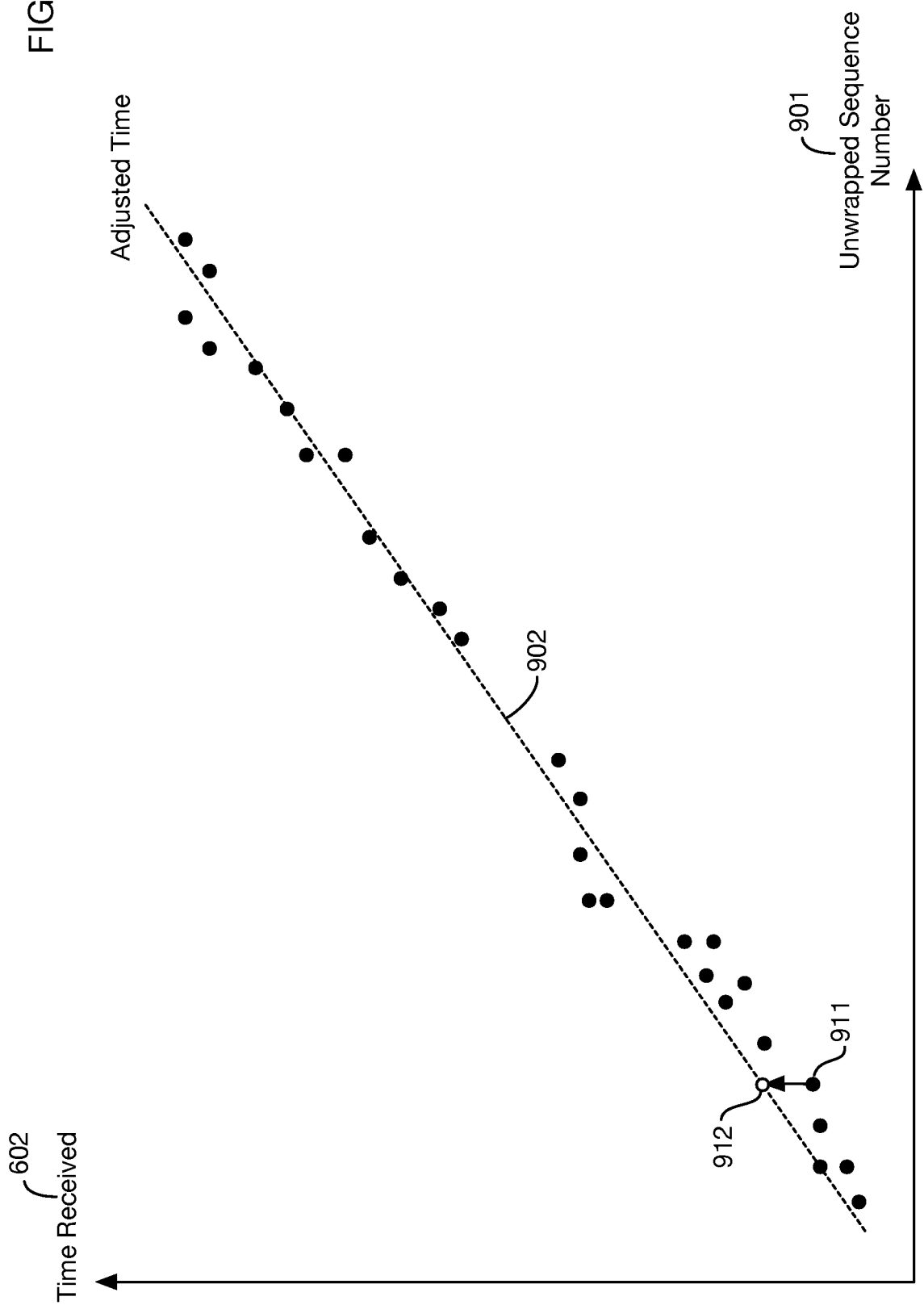
FIG. 9A illustrates a method that may be used to map unwrapped sequence number to an adjusted time that can be used to synchronize waveforms.

The next step 404 remaps the unwrapped sequence numbers to adjusted times, which may then be used in step 405 to synchronize waveforms. This mapping is generally a linear mapping so that it reflects the periodic sampling that occurred in the device before transmitting packets. A linear mapping from unwrapped sequence numbers to adjusted times may be determined using various methods. A first illustrative approach that may be used is to calculate a line through the unwrapped sequence number and received timestamp of the packet with the lowest received timestamp, and through the unwrapped sequence number and received timestamp of the packet with the highest received timestamp. This line effectively uses the average received rate of packets as the adjusted time interval between successive unwrapped sequence numbers. A second illustrative approach is to calculate a line through the unwrapped sequence number and received timestamp of the packet with the lowest received timestamp, with the line slope equal to the sampling period of the device (such as 256 milliseconds). A third illustrative approach is shown in FIG. 9A. This figure shows received packets' received timestamps 602 as a function of their unwrapped sequence numbers 901. A linear regression line 902 may be fit to these points, and this line may be used to map each point to the adjusted time that lies on the regression line. For example, packet 911 may be mapped to adjusted received time 912 that is on regression line 902.

FIG. 9B illustrates the final synchronization step 405 that synchronizes data based on the adjusted time calculated for each packet. Top plot 931 shows waveforms 921a and 921b from two illustrative sensors of a device, using the received time 602 as the time axis. The waveforms are distorted due to variable packet delays and other time inaccuracies. Synchronization 405 remaps the time axis of each waveform to the adjusted time 902. Plot 932 shows the result of this step, with synchronized waveforms 922a and 922b.

Figure 10:
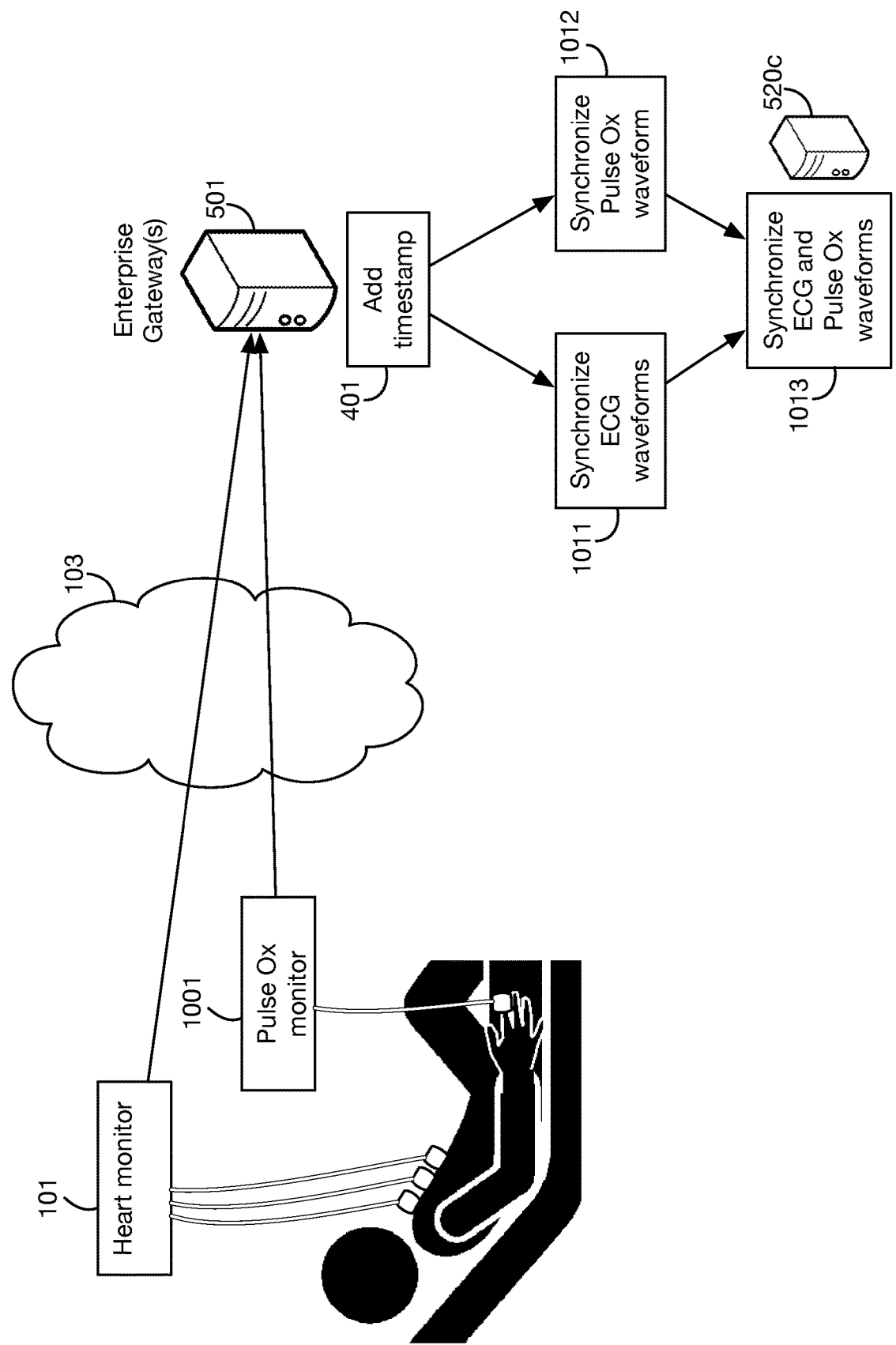
FIG. 10 illustrates an additional challenge of synchronizing waveforms across devices that may be addressed by one or more embodiments of the invention.

In some situations it may also be desirable to synchronize waveforms across multiple devices. This synchronization may be performed using an extension of the methodology described above. FIG. 10 shows an illustrative situation with two devices 101 and 1001 that monitor the same patient. Each device transmits packets over network or networks 103, and the packets are received by one or more servers 501 that perform step 401 to add received timestamps, as described above. On request or as needed, waveforms within each device are synchronized in steps 1011 and 1012, as described above. In some situations a final step 1013 may then be performed to synchronize waveforms across the devices, which is described below. This inter-device waveform synchronization may be performed by one or more inter-device synchronizing processors 520c. The processor or processors 520c that perform inter-device synchronization may be the same as or different from any of the other processors described above, such as enterprise gateway(s) 501 or servers 520.

FIG. 11 shows one illustrative approach to inter-device synchronization 1013. This approach is most effective when transmission latencies from the devices to the receiving server(s) 501 are roughly equal on average (even if individual packet delays may vary widely), and when a single receiving server is used or multiple receiving servers have closely synchronized clocks. The actual received time of packets then provides a common reference that can be used for synchronization. After mapping each packet to an adjusted time for each device, the adjusted times of the packets of interest can be modified by a constant amount for each device so that the average adjusted time equals the average received time; the waveforms between devices will then by time-synchronized. For example, plot 1100a shows the adjusted times 902a of packets from device 101 compared to their actual received times 602a, and plot 1100b shows the adjusted times 902b of packets from device 1001 compared to their actual received times 602b. The adjusted time bias 1102a for device 101 can be calculated for example as the average difference between the adjusted time and the received time for each packet, and similarly the adjusted time bias 1102b can be calculated for device 1001. The biases can be subtracted from each packet's adjusted time to synchronize the packets across devices. This procedure effectively centers packets' adjusted times on the line 1101 where adjusted times and received times are equal (on average).

Figure 12:
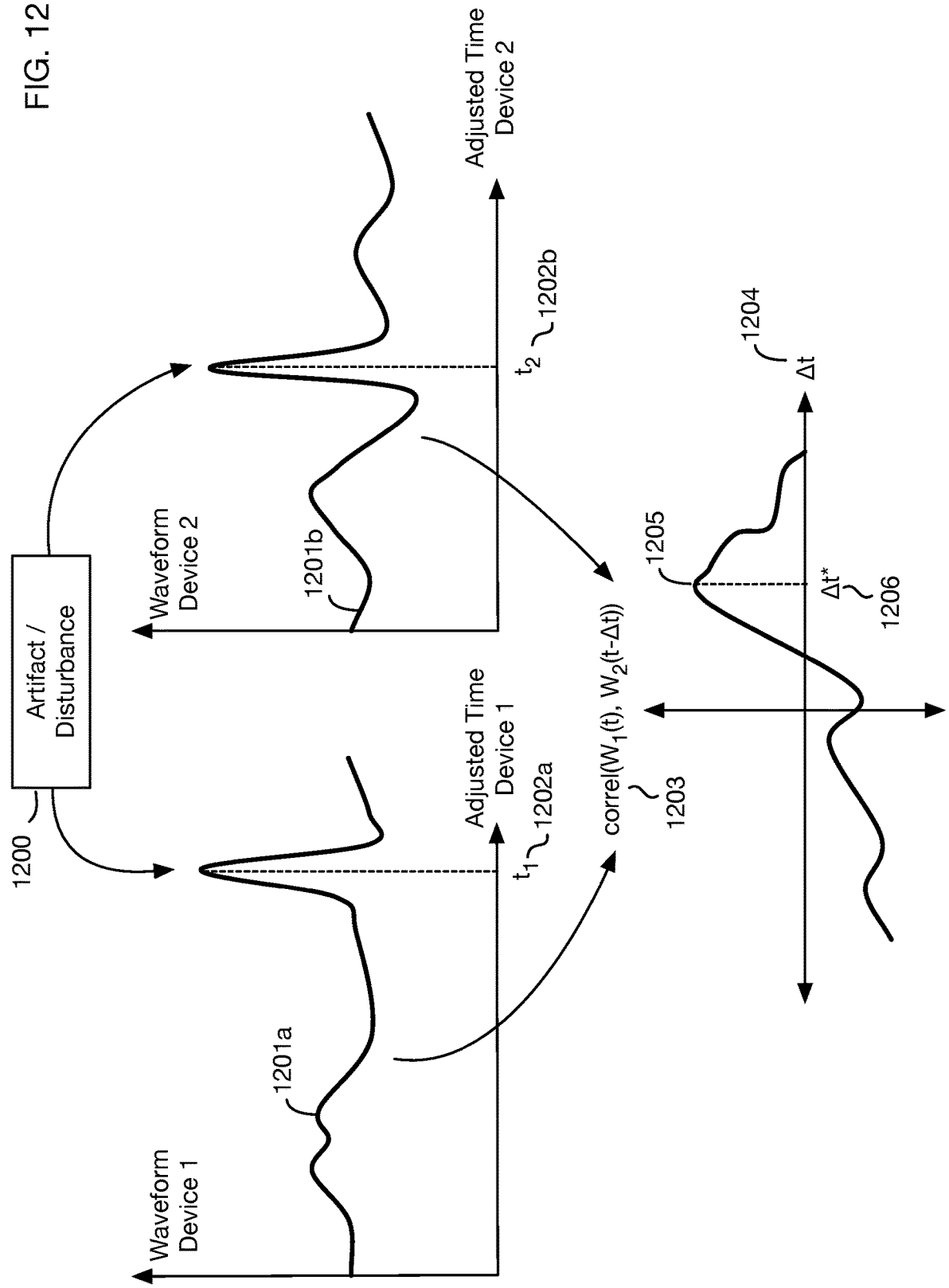
FIG. 12 illustrates another method that may be used to synchronize waveforms across devices, which uses an artifact that affects signals from multiple devices.

FIG. 12 illustrates another approach that may be used to synchronize waveforms across devices. In this approach, motion artifacts or other common disturbances that affect both devices may be used to determine the systematic time offsets between sensors connected to different devices that are connected to the same patient. For example, two pulse oximeters may be connected to the same individual but communicate through different devices each having a different set of sequence numbers. In the case of an ECG sensor, in addition to motion artifacts pacemaker signals may be used.

In this case, after synchronizing the waveforms associated with each device, measurement regions containing artifacts or common disturbances may be detected based upon a significant increase in spectral entropy and the lack of an associated periodic signal.

In the example shown in FIG. 12, artifact or disturbance 1200 affects signal 1201a from one device and signal 1201b from a second device. The artifact's effect is visible at adjusted time 1202a for the first device, and at adjusted time 1202b for the second device. The difference between these adjusted times 1202b and 1202a can be subtracted from the adjusted times for signal 1201b to synchronize the two devices' waveforms.

If the precise time of the artifact is not apparent in the signals, a cross-correlation 1203 can be performed between signals 1201a and 1201b with different time adjustments to one of the signals. The signals may for example be re-sampled to a common higher sampling frequency (e.g., 10×). The phase difference may be determined as the time offset 1206 associated with the maximum point 1205 of the curve 1203 generated via a cross-correlation calculation between the first waveform and time shifted versions of the second. To ensure a precise time offset, the maximum point may be further estimated as the zero crossing of the derivative of a locally fitted quadratic function. After determining the time offset between the first and second devices, the adjusted time axis of the second device may be adjusted by subtracting the time offset 1206.

In a large facility, for example a hospital with hundreds of patients and thousands of devices, very large amounts of data may be generated as devices stream their sensor readings and as other patient data sources, such as laboratory measurements and prescriptions, are integrated. It may be necessary or advantageous to store much or all of this data for subsequent analysis and data mining. This storage process 522 is shown in FIG. 5. With extreme amounts of data, however, storage presents significant challenges. One particular challenge is efficient indexing of data. Generating keys that uniquely identify each record of a database is essential to data warehousing. In addition to the uniqueness characteristic, the key must be immutable and easily indexed.

Figure 13:
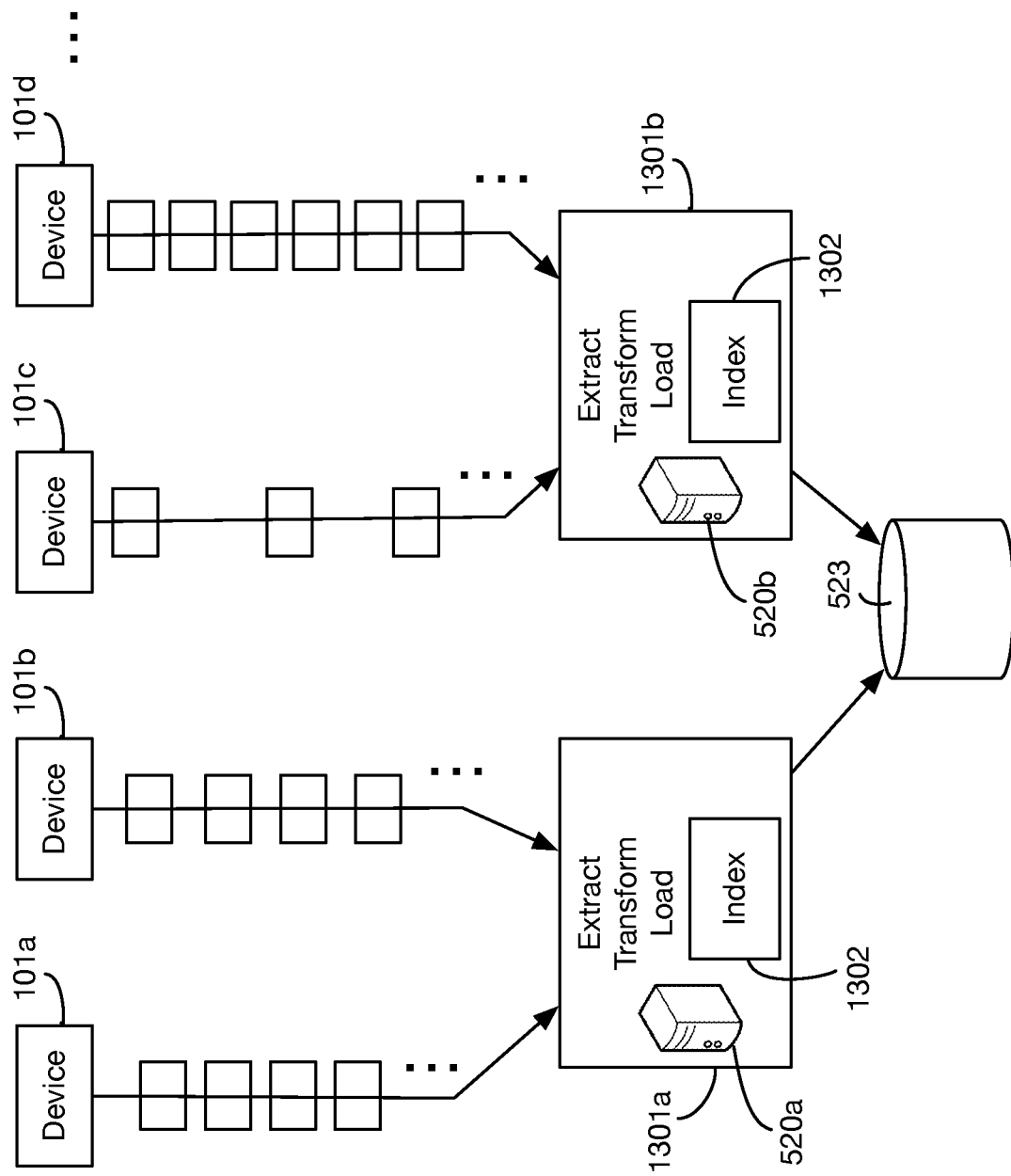
FIG. 13 illustrates an embodiment that indexes the data streamed from one or more devices, and stores the indexed data in a database or data warehouse.

A further challenge is that processing of the large number of data streams may require a distributed approach; a single server may for example not be able to process all streams simultaneously. This situation is illustrated in FIG. 13, where illustrative devices 101a, 101b, 101c, and 101d stream packets to two different subsystems 1301a and 1301b. Each of these subsystems performs ETL (extract, transform, load) on the streams, which includes indexing 1302 of the data with keys, and storage of the indexed data in one or more databases, data warehouses, or data lakes 523. Each subsystem may be associated with one or more data storage processors that perform any or all of these functions, such as processors 520a and 520b.

Because of the distributed ETL and the potentially large number of streams, generation of keys using a centralized solution (such as a single server that assigns unique keys via a sequence generator) may not be feasible. Centralized generators may also inhibit proper administration of decentralized systems which, for heightened security, limit access. Preferably keys should be generated using a deterministic mapping that can be applied independently by each subsystem 1301a and 1301b while ensuring key uniqueness. Although the generation of a GUID or other random key provides a potential solution, after insertion into a given table, other independent processes that reference the GUID's record would necessarily need to query the table to retrieve it, significantly reducing retrieval efficiency.

Figure 14:
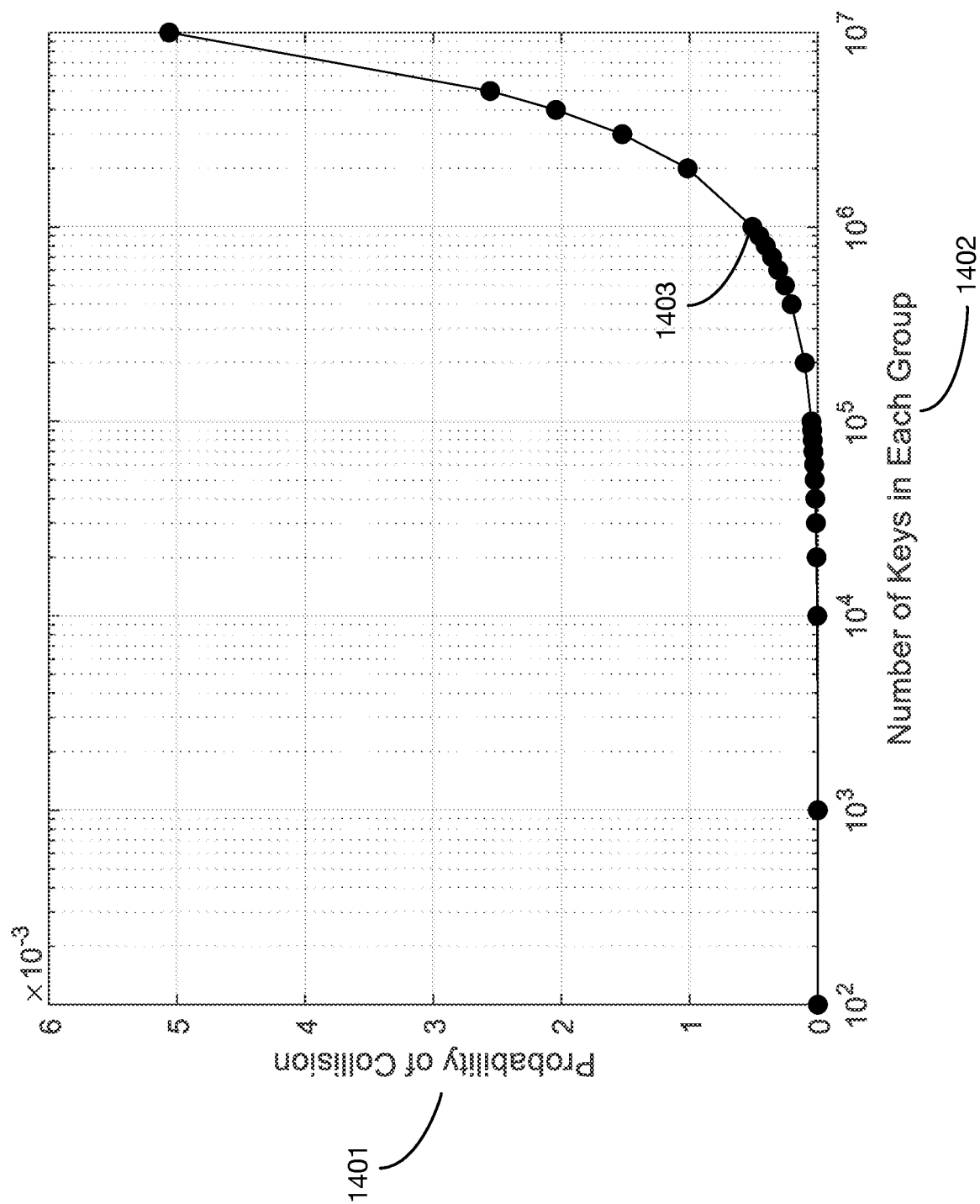
FIG. 14 shows a challenge with using hash codes as the index: the probability of hash collisions becomes large with millions, billions, or trillions of records.

A preferable distributed solution to key generation is a hashing algorithm, which deterministically maps some or all of the packet content into a hash code. Hashing also enables the calculation of a key without burdening the database via query. However, hashing algorithms are subject to hash collisions, which compromise uniqueness of keys or require post-processing to check for and address collisions. As the amount of data grows to millions, billions, or trillions of records a significant number of duplications will occur which will be destructive to the database. This issue is illustrated in FIG. 14, which shows experiments with hashing randomized 24 character alphanumeric strings to 9 digit hash codes. The chart shows the probability of each hash being a collision 1401 as a function of the number of hash codes generated 1402. Illustrative point 1403 shows that approximately 500 collisions will occur with 1 million generated hash codes.

The inventors have discovered a solution to the hash collision issue, which can be used in distributed systems and can accommodate the large amount of data generated by hundreds or thousands of streaming devices. This solution is to form keys as a combination of a prefix derived from the data and a hash code. Collisions between keys are thereby avoided as long as there are no hash collisions within a subset of data having the same prefix. This technique can greatly reduce the number of hash codes that must be unique.

An illustrative prefix that may be used in one or more embodiments is a time code that may be derived from the packet timestamp, for example. Illustrative time codes may be for example, without limitation, a year, a year and day-of-year, a year-day-hour, or a POSIX or similar date/time code or prefix or portion thereof. This code may be prefixed to a hash code of some or all of the content of a record, such as for example a hash code of a patient ID, a device ID, and a filename (derived from a date and time).

Figure 15:
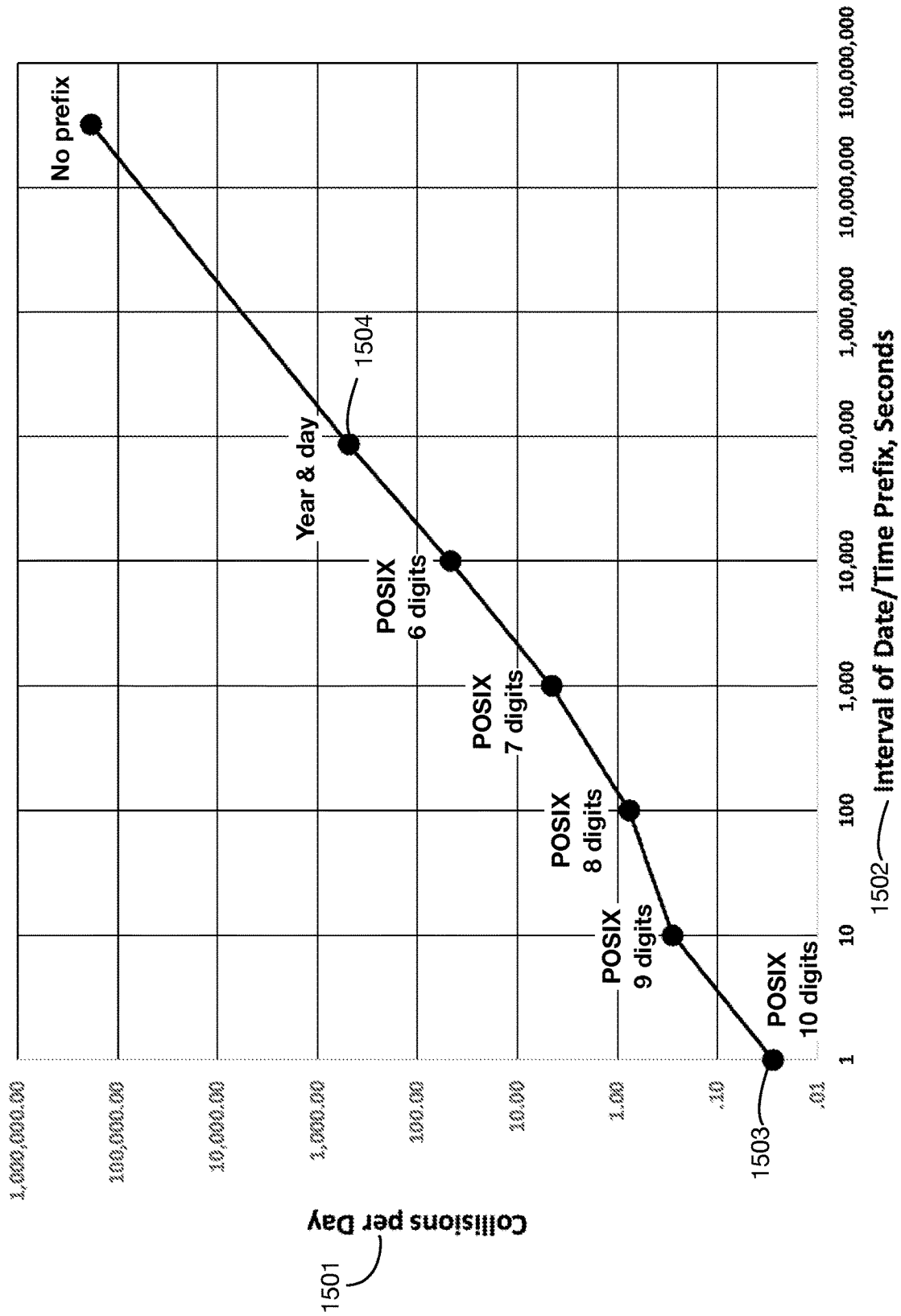
FIG. 15 illustrates a solution to the hash collision problem: prefixing the hash code with a date-time code, to reduce the number of indexes for which hashes should be unique.

FIG. 15 shows results of an experiment by the inventors for a simulated system that generates 1,000,000 records per day. The number of key collisions per day 1501 is shown as a function of the type of prefix used. Each prefix corresponds to a specific interval of time 1502 for which the prefix applies. For example, a 7-digit POSIX timestamp corresponds to an interval of 1,000 seconds. In this scenario, a prefix consisting only of the year and day-of-year 1504 still results in several hundred key collisions per day. A prefix consisting of a 10 digit POSIX timestamp 1503, which includes year, day, hour, minute, and second, results in a negligible number of collisions per day. The appropriate prefix may be selected based for example on the volume of data processed per day of the installation.

Figure 16:
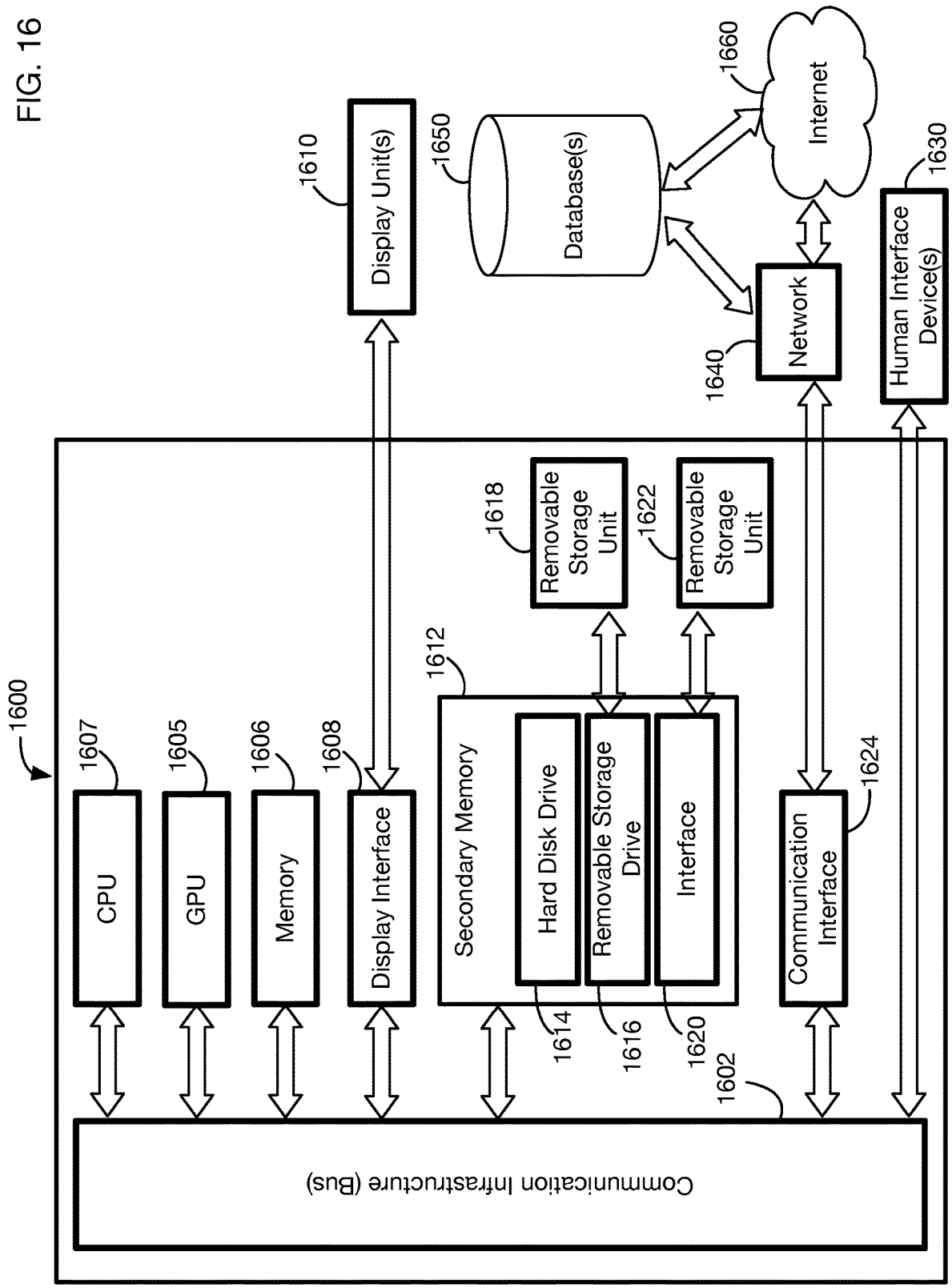
FIG. 16 shows illustrative computer hardware that may be used as or in any of the processors or systems described for the invention.

FIG. 16 shows an embodiment of exemplary computer 1600 that may be utilized in, by, or as any component in the system. In one or more embodiments, computer 1600 may be a network of computers, each of which may have any or all of the components shown in FIG. 16. In one or more embodiments, computer or computers 1600 may also be utilized to implement any function in the system, i.e., any step or act or function that executes in any computer or server or engine in the system. For example, computer or computers 1600 may be or may be a component of any transmitting device, such as device 101, any server or receiving or processing devices, such as servers 501 and 520. Computer or computers 1600 may for example execute or host any of the components of system 530, such as stream processing services 521, database 523, data warehouse 522, analytics 524, synchronization services 525, applications 526, application management 527, and application development 528. Computer or computers 1600 may for example be or be a component of any system 520c that performs cross-device synchronization 1013. It may be or be a components of any systems 520a and 520b that perform distributed indexing to generate keyzs for incoming data or events, which may then be distributed to any other system components. Computer 1600 may include processor CPU 1607 that executes software instructions specifically tailored to the respective functions of embodiments of the invention. The software instructions, otherwise known as computer program instructions, may reside within memory 1606. Computer 1600 may include processor GPU 1605, which may execute graphics instructions or other instructions for highly parallel operations, for example. GPU program instructions may also reside within memory 1606. Computer 1600 may include display interface 1608, which may drive display unit or units 1610 of any computer in the system as desired. Some computers 1600 may or may not utilize a display. Computer 1600 may include communication interface 1624, which may include wireless or wired communications hardware protocol chips. In one or more embodiments of the invention communication interface 1624 may include telephonic and/or data communications hardware. In one or more embodiments communication interface 1624 may include a Wi-Fi™ and/or BLUETOOTH™ wireless communications interface. Any wireless network protocol or type may be utilized in embodiments of the invention. CPU 1607, GPU 1605, memory 1606, display interface 1608, communication interface 1624, human interface devices 1630, secondary memory 1612, such as hard disk 1614, removable storage 1616, secondary memory interface 1620 and removable storage units 1618 and 1622 may communicate with one another over communication infrastructure 1602, which is commonly known as a "bus". Communications interface 1624 may communicate over any wired or wireless medium that allows for communication with other wired or wireless devices over network 1640. Network 1640 may communicate with Internet 1660 and/or database or databases 1650. Database 1650 may be utilized to implement any database, data warehouse, data lake, or data hub described herein.

As described above with respect to FIGS. 10, 11, and 12, in some situations it may be desirable to synchronize signals across devices. The devices may not have synchronized clocks, or if they do then their clocks may be only coarsely synchronized (for example to within a second). Precise synchronization of signals from different devices to within a few milliseconds may be necessary in some situations. For example, machine learning methods applied to the combined data from different devices is much more effective at detecting and predicting clinical events when the time scales of all signals are very precisely aligned (to within milliseconds). Examples implemented by the inventors, using ECG and EEG signals synchronized using the method of the invention, include prediction of epileptic seizures, respiratory failure, and cardiac collapse by inputting synchronized ECG and EEG signals (along with other vital sign data) into a gradient boosting decision tree algorithm or into a convolutional neural network.

Figure 17:
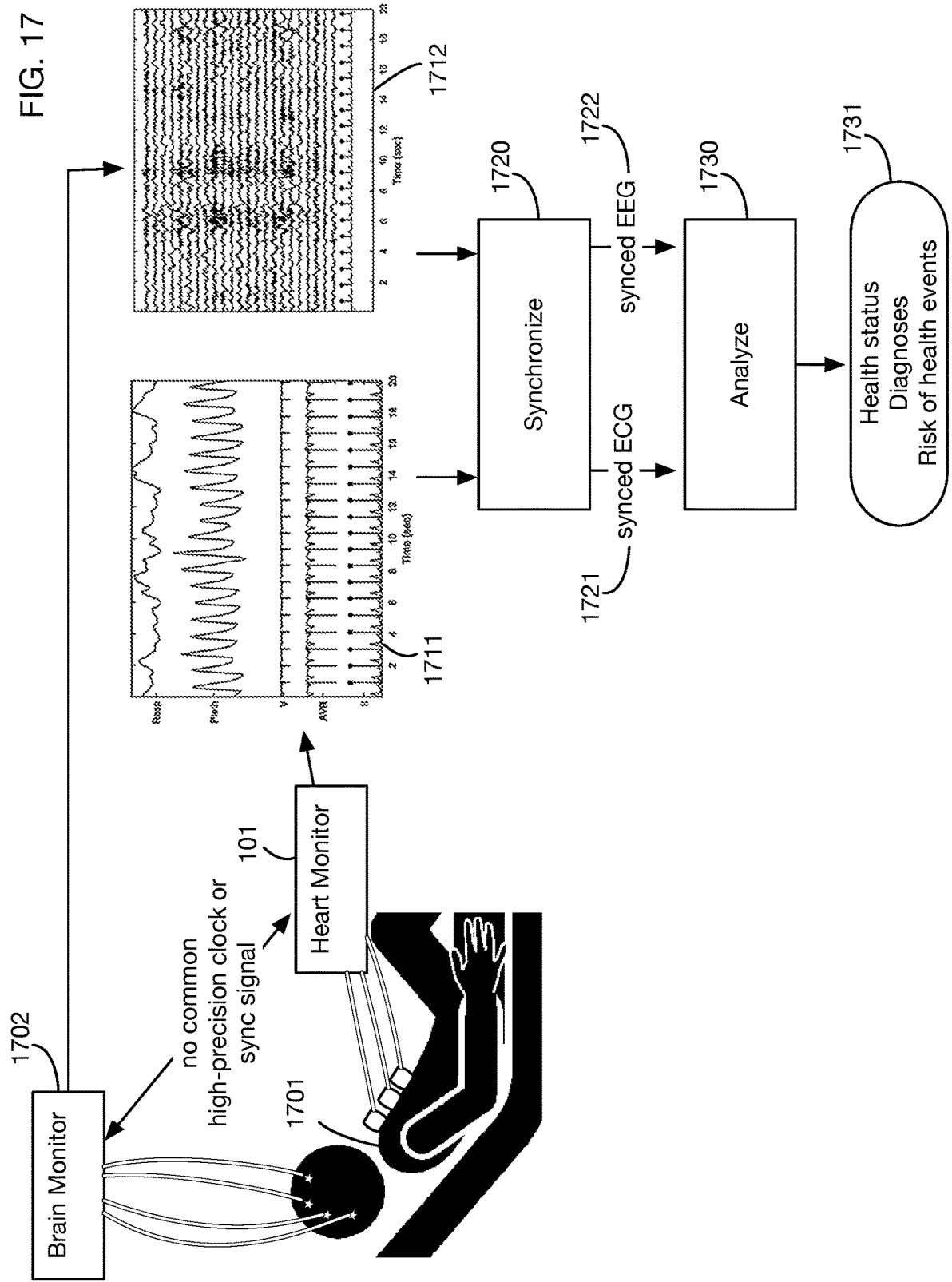
FIG. 17 shows a synchronization problem addressed by one or more embodiments of the invention where signals from one device (such as an EEG) need to be time-synchronized precisely with signals from another device (such as an ECG or bedside monitor) so that the combined, synchronized signals can be jointly analyzed.

FIG. 17 shows an illustrative situation where an embodiment of the synchronization method of the invention may be valuable. Patient 1701 is coupled to a heart monitor 101 and to a brain monitor 1702. The heart monitor may be part of a bedside monitoring system, for example. The heart monitor 101 may generate data 1711 that includes ECG signals, and brain monitor 1702 may generate data 1712 that includes EEG signals. Devices 101 and 1702 are separate devices and they do not have high precision (e.g., atomic) clocks that are synchronized; they are also not coupled to a common trigger signal. The reported signals 1711 may therefore have different timestamps and time axes compared to the signals 1712. To use the combined data 1711 and 1712 together, synchronization procedure 1720 is applied to signals 1711 and 1712. This synchronization 1720 determines a time shift (phase difference) that can be applied to one set of signals to bring it into time alignment with the other set of signals. Time shifting one (or both) sets of signals results in synchronized signals 1721 and 1722, for the synchronized heart signals and brain signals, respectively. These synchronized signals may then be input into analysis procedures 1730 to generate outputs such as health status metrics, diagnoses, and predicted risks of certain health events. The synchronization of signals may be applied in both real-time as well as retrospectively. For example, data may be collected simultaneously on a bedside monitor and EEG sensor and stored independently. At a later date and time, the two data sets may be integrated and synchronized.

The example illustrated in FIG. 17 requires synchronization of heart signals 1711 and brain signals 1712; however, similar solutions may be applied to synchronization of signals from any set of two or more devices coupled to a patient that measure any biological or clinical signals of interest. Although the illustrative scenarios described below use the example of synchronizing signals from a heart monitor and a brain monitor, one or more embodiments of the invention may be used to synchronize any signals from any types of devices that use any type or types of sensor technologies. For example, in addition to measuring the electrical activity of the heart, the variation in the time series of heart beats (or heart rate frequency), may be detected through photoplethysmography, oscillometry, near-infrared spectroscopy, phonocardiography, impedance cardiography or accelerometry. Consequently, devices employing either the same or different sensor technologies may utilize the frequency variation of the heart rate to synchronize their time axis.

Further, variation in heart rate frequency is not the only physiological signal that may serve as a basis for the synchronization. A person's respiratory rate varies through time and is simultaneously measurable on multiple devices as it leads to natural vibration due to the rise and fall of the diaphragm, variation in the electrical activity of the heart and a change in instantaneous blood pressure. Devices capable of simultaneously measuring the respiration rate through impedance sensors, accelerometers, pressure transducers, or near-infrared transmittance or reflectance may use the variation in this signal to synchronize their time axes.

In the neurological testing, including EEG and/or EMG, the electrical activity of the ECG is present due to either intentional recording of ECG as part of the neurologic data set, or it can be extracted from the waveforms. For example, due to the amplitude of the ECG electrical waveform, the ECG artifact is sometimes pronounced, and while the ECG waveform in the EEG is commonly called an artifact, in this case it would lend itself to alignment with the separate data set's ECG for synchronization. As described below, the ECG signal can be extracted from EEG signals with channel combinations (with input 1 and 2 sets defined based on ECG polarity of left versus right) and through filtering techniques such as independent component analysis. In cases of EMG recording (such as in the operating room during neurological monitoring) the EMG could also lend itself to ECG waveform extraction (such as using opposing extremity EMG L-R).

Given the synchronization of waveforms within a single bedside monitoring device as described in the specification, it should be clear that this method not only synchronizes EEG and ECG waveforms but also leads to the synchronization of all bedside monitoring waveforms with the collected EEG signals. These include but are not limited to pressure, impedance, near-infrared, photoplethysmography and respiratory (e.g., EtCo2) waveforms. Further, waveforms from devices connected to the bedside monitor are aligned, such as ventilators, pulse oximeters and infusion pumps.

In the operating room, the neurological monitoring can be aligned and synchronized with the physiological recording (ECG, respiration, temperature, blood pressure) and aesthesia if that data set is synchronized with the physiological recordings as well.

The methods described in this application may also be applied to wearable devices. For example, the near-infrared based waveforms collected from a watch with an ECG waveform may be aligned to either the bedside monitor or the neurology equipment utilizing the method described in the application. In this case, only a segment of ECG data may be available to determine a time offset from that of the second device. This offset may be used as an approximation to further align the wearable data when an ECG signal is not collected.

Figure 18:
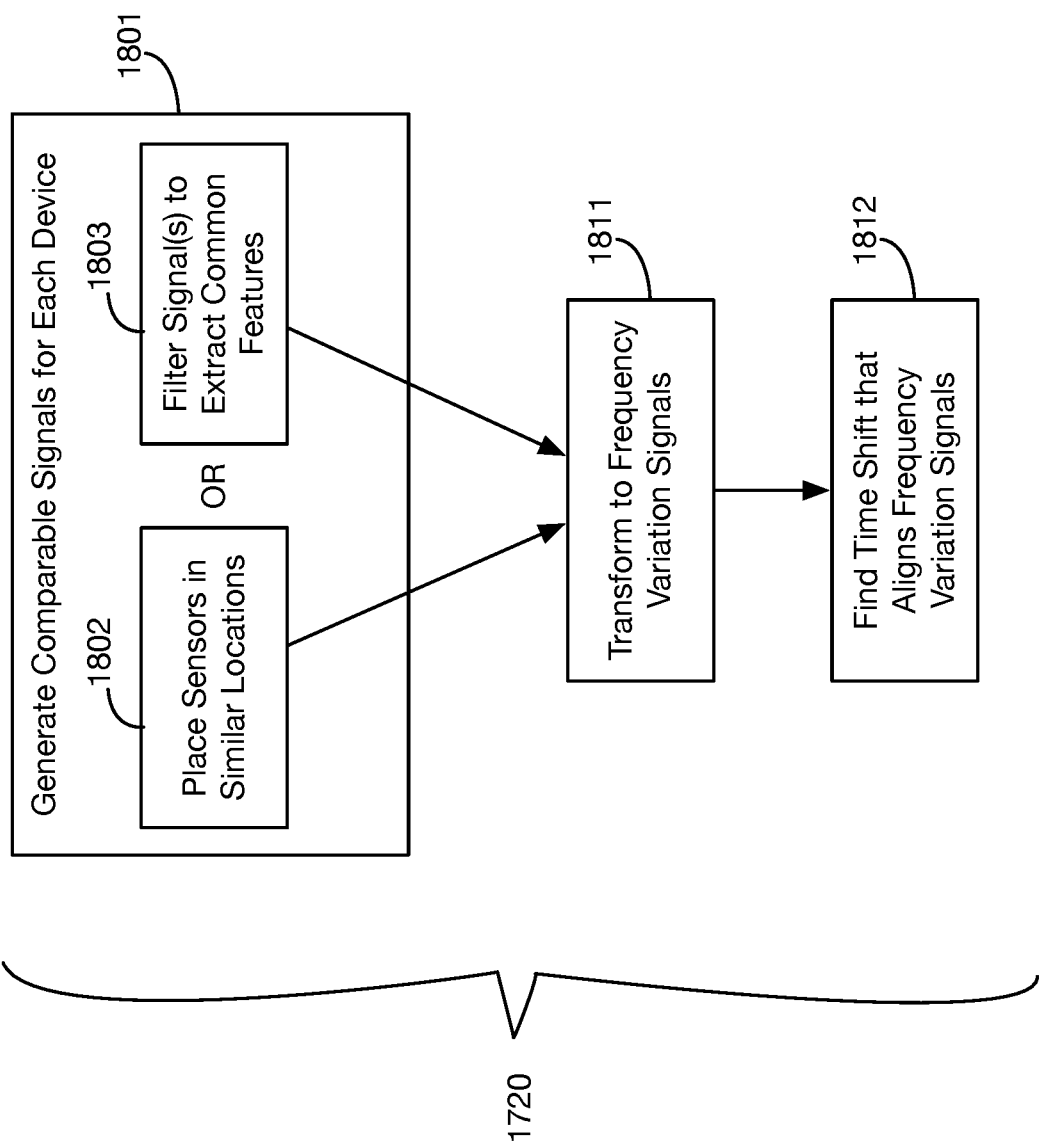
FIG. 18 shows a flowchart of illustrative steps performed by one or more embodiments of the invention to time-synchronize signals from different devices.

FIG. 18 shows a flowchart of an illustrative process that performs synchronization 1720 of signals from different devices. Each of the devices may produce one or more signals, which may be for example time series of data sampled at any frequencies. A first step 1801 may be to generate comparable signals from each of the devices. These signals may have features that can be compared to determine the time offset between the devices. For example, each of the devices may measure (either directly or indirectly) some common biological feature, which can then be used to synchronize signals across devices. FIG. 18 illustrates two techniques 1802 and 1803 that may be used in one or more embodiments to generate comparable signals. Technique 1802 is to place selected sensors from each device in similar locations so that these sensors receive similar inputs from the body. For example, two of the electrodes from a brain monitor may be placed next to two corresponding electrodes of a heart monitor, so that these two pairs of electrodes measure similar inputs. Technique 1803 does not require placing sensors in similar locations; instead, some of the normal signals from one or both of the devices are filtered to obtain signals containing the common features. Step 1803 generates comparable signals by filtering signals from one (or both) devices. The filtering may for example recover a portion of one biological signal that contaminates or affects a different biological signal. Two illustrative filtering methods that may be used in one or more embodiments include resolving signals from one device into independent components and selecting a component that matches a signal from a second device, and applying a matched filter to signals from one device where the matched filter is based on a template signal for the biological signal measured by a second device. These filtering methods are illustrated below where filters are applied to EEG signal to recover a heart signal that can be synchronized with signals from a heart monitor; similar filters may be applied to signals from any type of device to recover a signal that corresponds to another device.

Either or both of these techniques 1802 and 1803 may be used in one or more embodiments to generate comparable signals.

After obtaining comparable signals from each device, one or more embodiments may transform these signals in step 1811 into frequency variation signals. For example, for ECG signals a frequency variation signal may be the time series of intervals between successive ECG QRS waveform complexes, also known as the RR-interval. As described below, directly comparing biological signals may be difficult in some situations because these signals are almost periodic, making it difficult to determine an exact time shift between the comparable signals of different devices. Using frequency variation signals instead of the measured sensor values may facilitate calculation 1812 of the time shift that aligns the frequency variation signals from different devices. This time shift may then be applied to signals from either of the devices to synchronize all of the device signals.

Steps 1801, 1811, and 1812 may be performed in real-time (or almost real-time) as signals are captured from different devices, or may be retrospectively applied to stored data previously captured from different devices.

Step 1811 of transforming device signals into frequency variation signals may be performed using any desired algorithm that detects points in time when cycles start or stop or when specific features within a cycle occur. For example, for certain biological signals there may be a distinctive peak signal value that occurs in each cycle; the time differences between occurrences of these peak values may be used as a frequency variation signal. (A "peak" value may refer to a maximum value or a minimum value within a cycle.) For heart signals for example, the R-wave generates a distinctive and easily recognizable peak value in voltage during each heartbeat cycle, and the difference between the times of successive R-wave peaks (known as the RR-interval) may be used as the frequency variation signal, as illustrated below. Similar peak-to-peak intervals (where peaks may be maximum or minimum values) may be used as frequency variation signals in other types of signals. Another approach to obtain frequency variation signals that may be used in one or more embodiments is to generate a cross correlation curve between a template that represents a typical cycle for the biologic signal and the observed signal; peaks in the cross correlation indicate where the template aligns with the biological signal, and time differences between these peaks may be used as the frequency variation signal.

Figure 19:
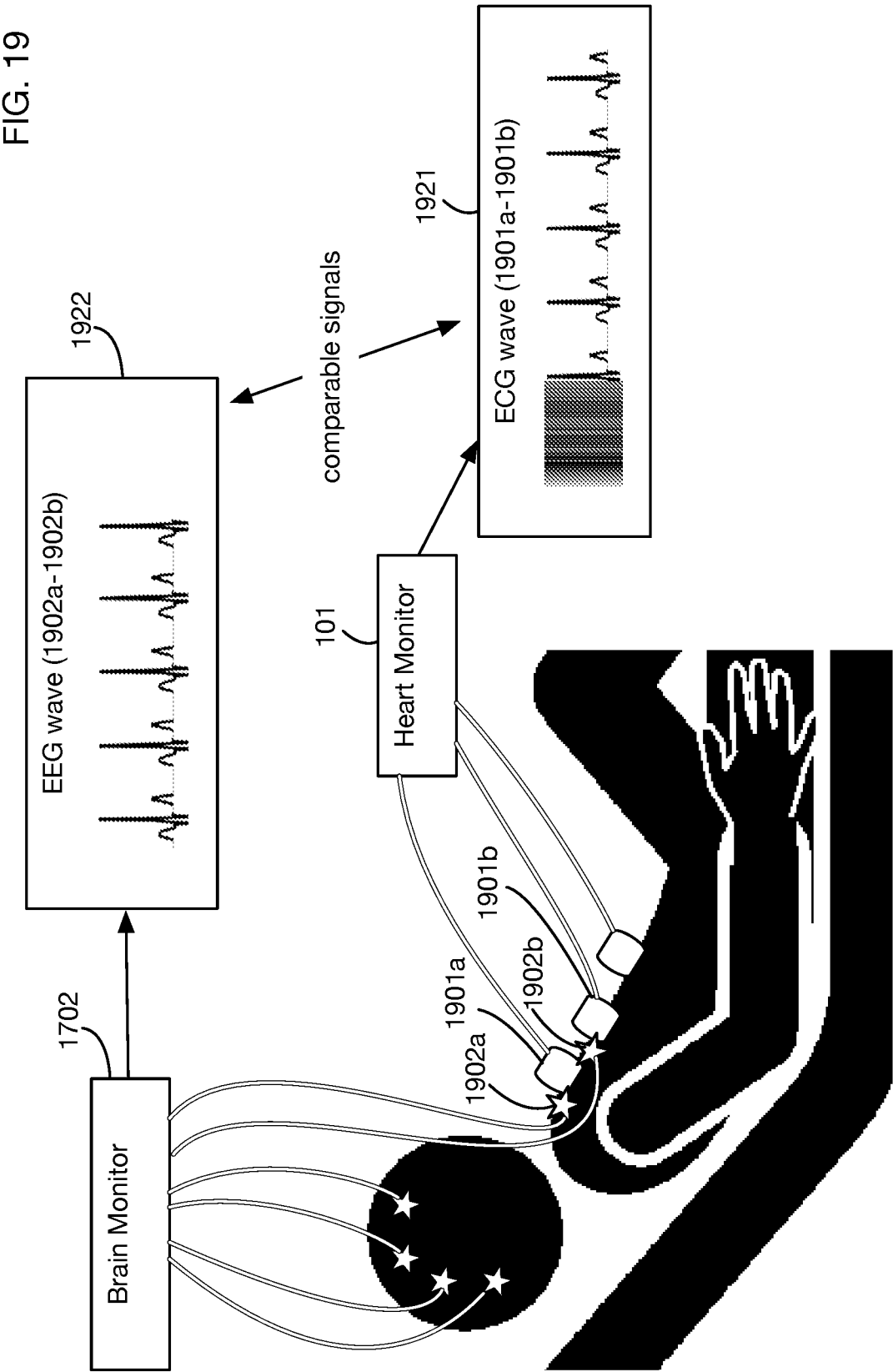
FIG. 19 shows an illustrative technique used in one or more embodiments of the invention to generate a common signal that may be used to time-synchronize signals from different devices: sensors from two (or more) devices may be placed in similar locations so that the devices see common signals.

FIGS. 19 through 22 illustrate the steps 1801, 1811, and 1812 for signals from a heart monitor and a brain monitor. Similar steps may be performed for signals from any types of devices; the techniques that are illustrated are not limited to EEG/ECG synchronization. FIG. 19 illustrates step 1802 of obtaining comparable signals across devices by placing sensors in similar locations. In this example, electrode 1902a of brain monitor 1702 is placed next to electrode 1901a of heart monitor 101; similarly, electrode 1902b of brain monitor 1702 is placed next to electrode 1901b of heart monitor 101. With these placements, voltage signal 1922 across electrodes 1902a and 1902b will be similar to voltage signal 1921 across electrodes 1901a and 1901b. (The sign of one signal may need to be reversed if the polarities of the voltage measurements are not the same.) In this example, one of the existing signals from heart monitor 101 is used as the comparable signal for that device, and selected electrodes from brain monitor 1702 are placed near heart monitor electrodes to measure a similar signal. In other situations, the electrodes of either or both devices may be repositioned to obtain comparable signals. In one or more embodiments, electrodes or other sensors may not need to be placed directly next to sensors from another device if the sensor data is similar for the two locations, or if the effect of the distance between the sensors of the two devices can be modeled or compensated for to generate comparable signals.

Figure 20A:
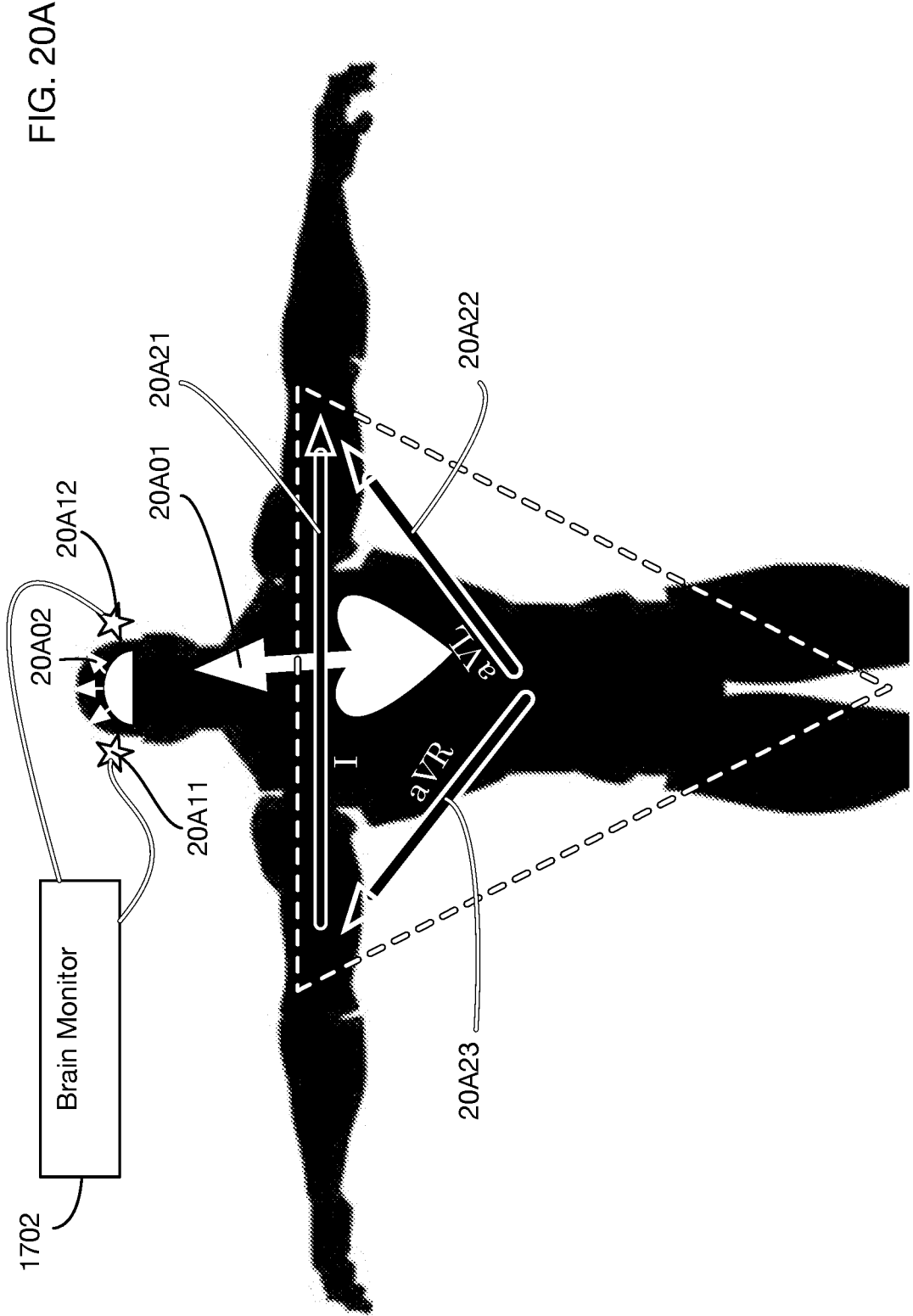
Figure 20D:
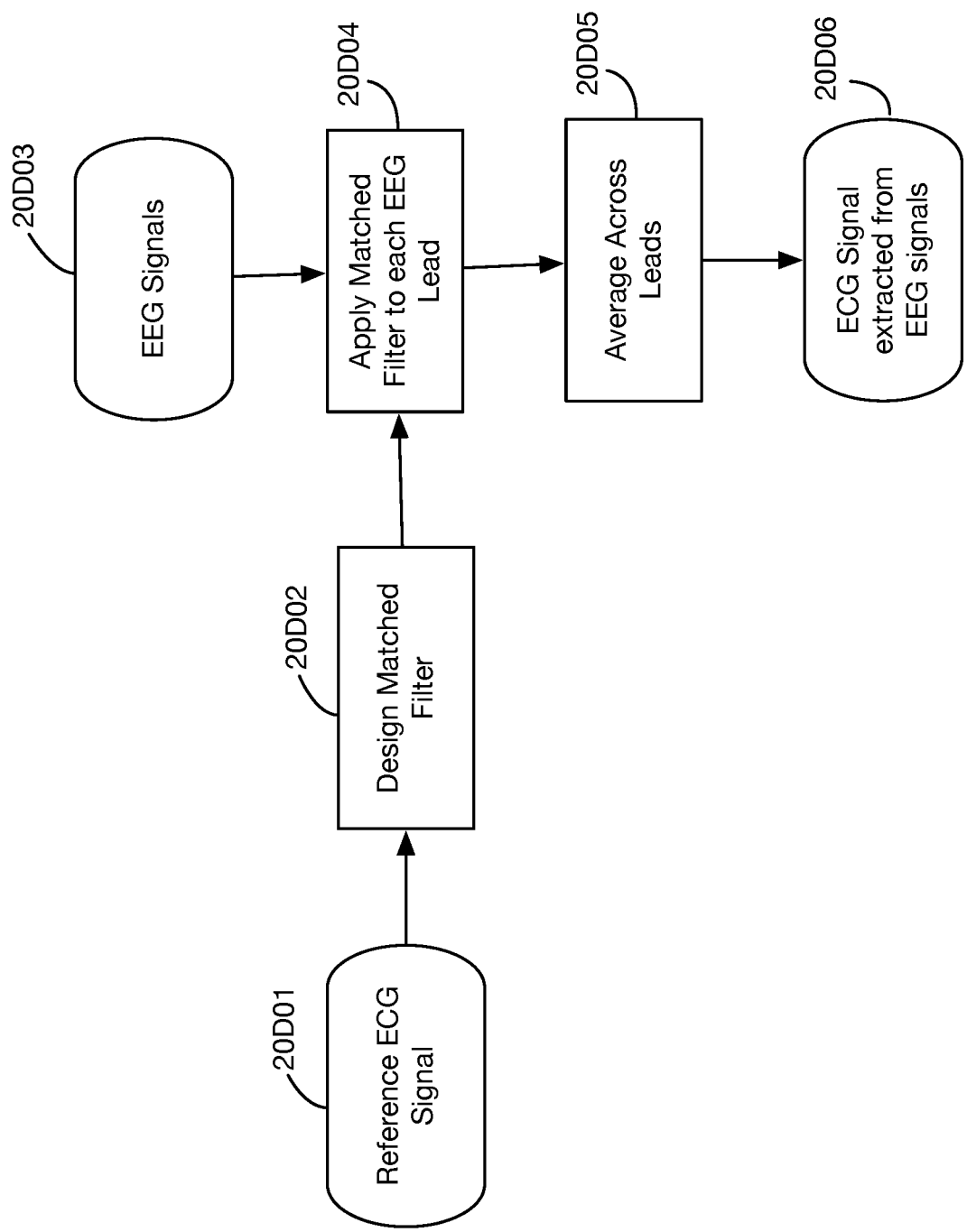
Figure 20E:
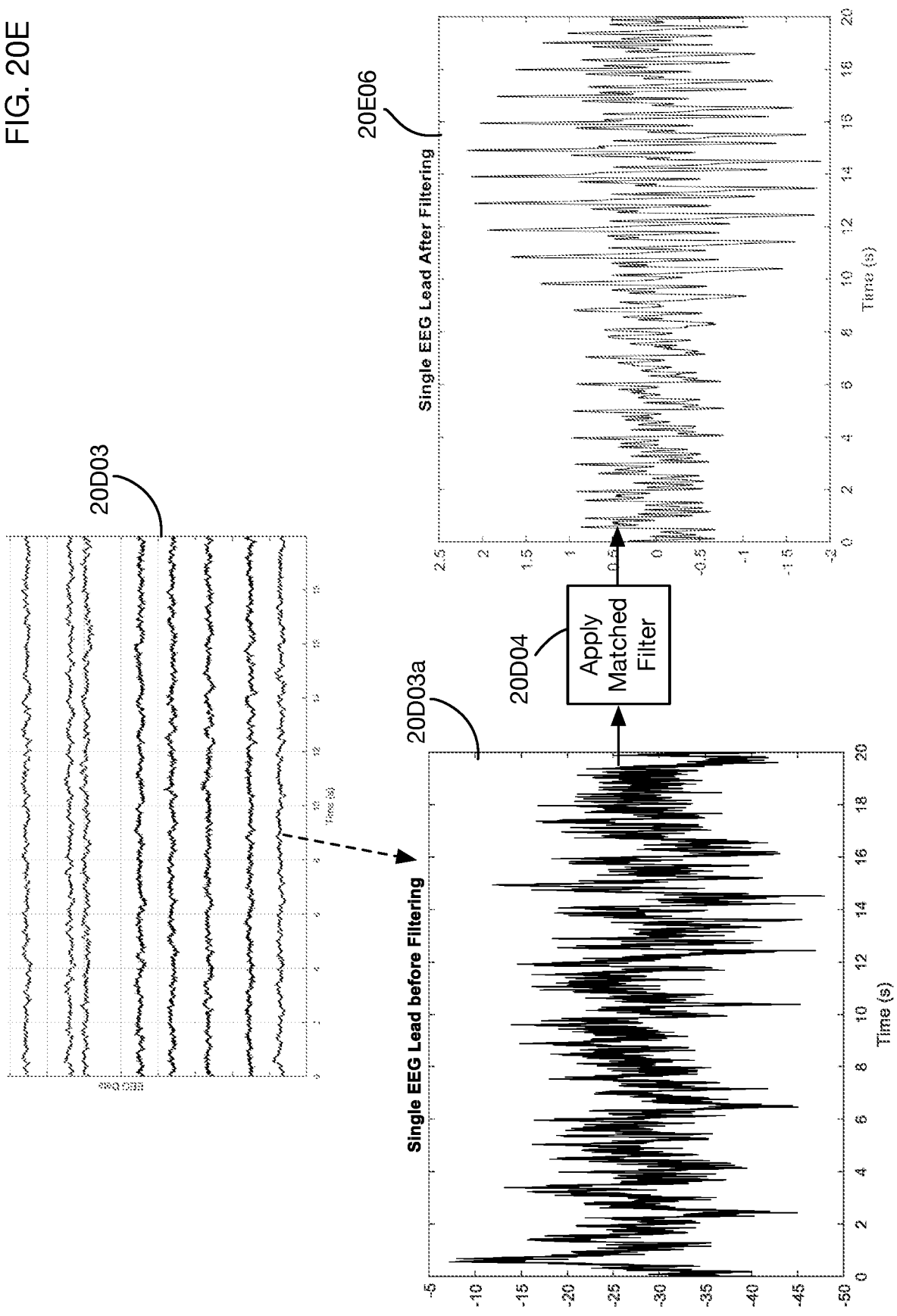

In one or more embodiments of the invention, techniques may be used to filter the EEG signals to generate a "cardiac"-like signal from EEG signals, even if all EEG electrodes are placed on the patient's head. As illustrated in FIG. 20A, electrodes of a brain monitor 1702 generally pick up cardiac signals 20A01 in addition to brain activity signals 20A02. The amplitude of cardiac signals 20A01 is typically an order of magnitude greater than the amplitude of brain activity signals 20A02, so that even electrodes on the patient's scalp will sense the cardiac waveform. Cardiac electrical signals have a strong left to right (or right to left) polarity, which is measured for example with traditional ECG leads 20A21, 20A22, and 20A23. EEG electrodes on opposite sides of a patient's scalp, such as electrodes 20AA and 20A12, will typically measure this cardiac signal (in addition to measuring the brain activity signals). Because the measured signals in the EEG electrodes represent a combination of brain activity signals and the polar cardiac signals, the EEG signals must be filtered to separate the cardiac signal from the brain activity signals. Two illustrative filtering techniques are illustrated in FIGS. 20B through 20E; FIGS. 20B through 20C illustrate decomposition of EEG signals into independent components, and FIGS. 20D and 20E illustrate application of a matched filter to EEG signals.

FIG. 20B shows a simplified example of transformation of EEG signals into independent components to identify the cardiac signal. Five EEG signals 20B01 are captured from electrodes on the patient's scalp. Signal 20B02 may for example correspond to voltage differences between electrodes on opposite sides of the head, such as on the earlobes or mastoids; this signal shows a distinct periodic beat that reflects the strong effect of the cardiac signal on this EEG signal. In step 20B03, the EEG signals 20B01 are resolved into independent components 20B05, using statistical techniques that are known in the art. Step 20B04 identifies the cardiac component 20B07 as one of the independent components 20B05; this step can be performed by matching the shape of the independent component waveforms to the expected shape of a cardiac signal. In waveform 20B07 the R-wave of the cardiac rhythm is clearly visible.

The application of independent components analysis to EEG waveforms is widespread, often because it is desirable to eliminate the effect of the cardiac component on the waveforms to focus more clearly on brain activity. (The goal in this application is the opposite: it is to extract the cardiac signal from the EEG signals to form the basis for time synchronization with heart monitor data.) Once the cardiac component 20B07 is identified, it can be easily removed from the waveforms 20B01 in step 20B08 by setting the coefficients 20B09 of the cardiac component to zero in the decomposition 20B06 of the original waveforms 20B01 into their components 20B05.

FIG. 20C illustrates application of the independent components technique to a full set 20C01 of EEG waveforms. The last two waveforms 20C01 and 20C02 correspond to electrodes on opposite sides of the patient's head, and they do show an apparent cardiac rhythm. Signals 20C01 are transformed into independent components 20C05, and the cardiac signal 20C07 is identified as one of these components; the sharp R-wave peaks at regular intervals are apparent in this component.

FIG. 20D illustrates another approach for filtering EEG signals 20D03 to obtain a cardiac signal. Based on a reference ECG signal 20D01, step 20D02 may generate a matched filter that uses signal 20D01 as the template for the filter. The matched filter may then be applied in step 20D04 to each of the ECG signals 20D03. Step 20D05 may then average the filtered signals across all of the ECG leads to form extracted cardiac signal 20D06.

FIG. 20E illustrates the use of a matched filter based on a cardiac reference signal applied to an EEG signal 20D03a from a set of EEG waveforms 20D03. After application of the matched filter 20D04, the filtered signal 20E06 shows very distinct peaks that indicate the presence of the cardiac signal (combined with the "noise" of the brain activity signals). Because the cardiac signal will be present in different amounts in the different EEG signals 20D03, averaging the filtered signals across all EEG leads will increase the sensitivity of the detection of the cardiac waveform.

Many biological signals are approximately periodic, such as heart signals 1922 and 1921 of FIG. 19 that approximately repeat for every heartbeat. This quasi-periodicity creates a potential challenge for determining the time shift that aligns the two comparable signals, as illustrated in FIG. 21. FIG. 21 shows two perfectly periodic signals 2101 and 2102, offset by various phase shifts 2103. For phase shifts 2103a and 2013c, the signals are identical; similarly, signals are identical for phase shifts 2103b and 2103d. More generally, phase shifts that differ by any integral number of periods are indistinguishable for perfectly periodic signals.

Even for biological signals that are "almost" periodic, but with some fluctuations between periods, it may be difficult to determine the time shift between comparable signals of two devices. FIG. 22 illustrates this phenomenon for cardiac signals 1921 and 1922 of FIG. 19 measured by heart monitor 101 and brain monitor 1702, respectively. These heart signals are approximately periodic with period 2204 of approximately one second, corresponding to a heart rate of 60 beats per minute. Graph 2203 overlaying the two signals shows that signal 1922 appears to lead signal 1921 by an amount 2205 of approximately 0.25 seconds. However, as illustrated in FIG. 21, time offsets that differ by 2230 by an integral number of periods could also be present.

To address these situations with quasi-periodic signals, in one or more embodiments the comparable signals 1921 and 1922 may be transformed to signals that can be more easily analyzed to determine the correct time offset between signals. One technique that may be used in one or more embodiments is to transform signals into measures of frequency variation across periods. For cardiac signals, a common measure of frequency variation is the RR-interval, which measures the time difference between peaks of the R-wave in a heart cycle. FIG. 23 shows RR-interval curves 2301 and 2302 obtained from cardiac signals 1921 and 1922, respectively. The curves 2301 and 2302 plot the RR-interval at the time of each R-wave peak, measured from the previous R-wave peak; for example, point 2311 corresponds to interval 2211 in FIG. 22, point 2312 corresponds to interval 2212, point 2321 corresponds to interval 2221, etc. Unlike curves 1921 and 1922, the RR-interval curves are not quasi-periodic; therefore, it is much easier to determine the time offset between them. These curves show that in fact the signal 1922 lags signal 1921, instead of leading it as seemed apparent in FIG. 22. The time offset 2305 obtained from aligning the RR-interval curves is therefore the correct offset between signals 1921 and 1922.

Figure 24:
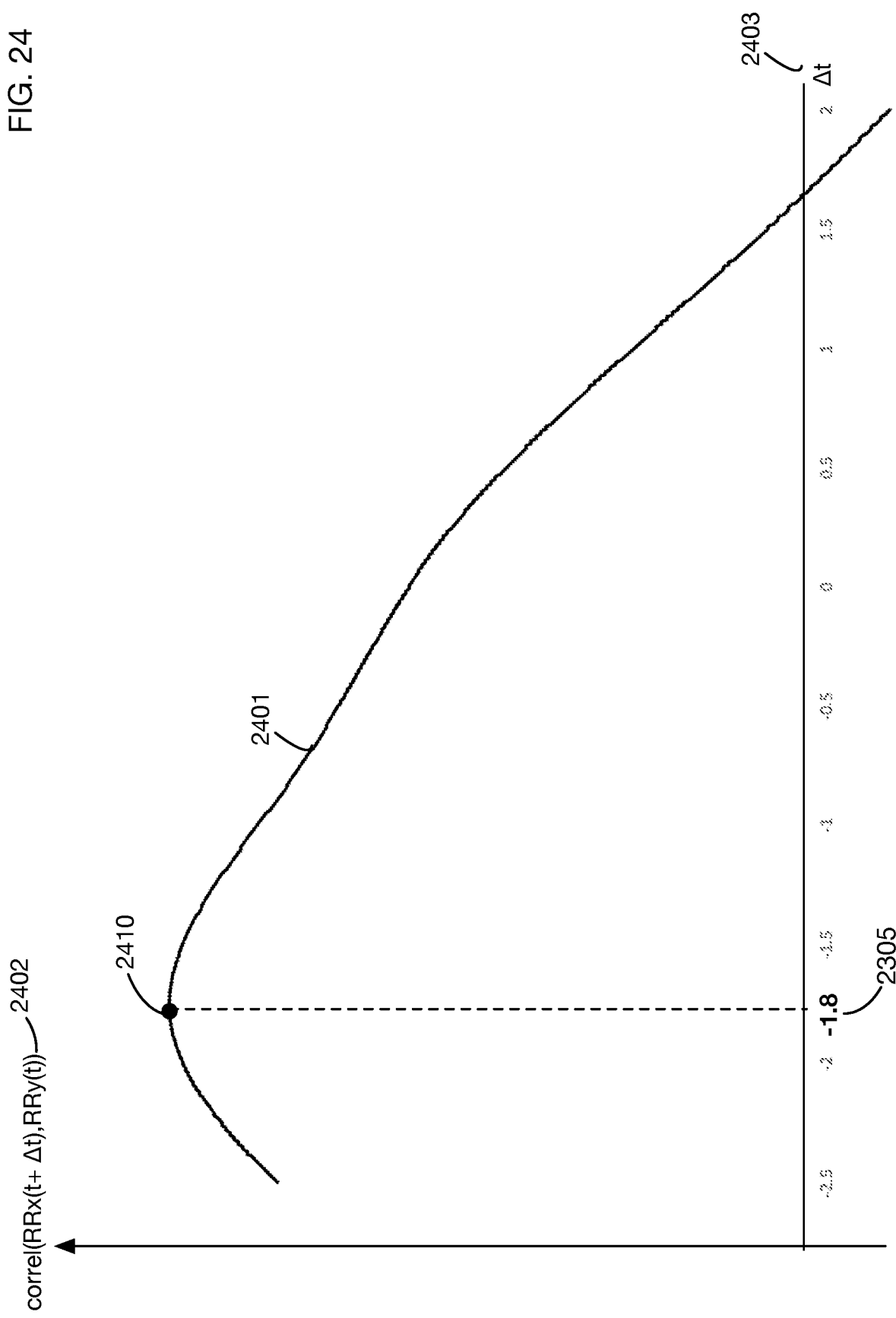
FIG. 24 illustrates calculation of an optimal time offset that aligns the RR-interval signals of FIG. 23.

The precise time offset between signals may be calculated by maximizing signal cross-correlation at different offsets, similar to the procedure described above with respect to FIG. 12. For example, FIG. 24 shows a curve 2401 of cross-correlations 2402 between the RR-interval curves 2301 and 2302, at different values for time shifts 2403 between the two signals. The maximum correlation 2410 occurs at time offset 2305, as expected, and may be further refined by oversampling or interpolation of the region surrounding the peak location. It is also possible to obtain this result by correlating the original signals 1921 and 1922; however, because of the quasi-periodicity of these signals, the analysis is less clear and would be computationally demanding. This situation is shown in FIG. 25. Curve 2501 shows cross-correlation 2502 between signals 1921 and 1922 at various time offsets 2503. The global maximum across the range explored for time shifts is at point 2521, which corresponds to the optimal time shift 2305 found using the RR-interval correlations in FIG. 24. However, the curve 2501 shows many other local maxima, many of which correspond to offsets that differ from 2305 by integral numbers of the (approximate) period; for example, local maximum 2522 at offset 2205 corresponds to the naïve time offset described with respect to FIG. 22. Analysis of the RR-interval (or similar frequency variation) curves is therefore likely to yield a more stable result for the optimal time offset between the signals, since it is less subject to confusion due to multiple local maxima.

While the invention herein disclosed has been described by means of specific embodiments and applications thereof, numerous modifications and variations could be made thereto by those skilled in the art without departing from the scope of the invention set forth in the claims.

What is claimed is:

1. A method for synchronizing biological signals from different monitoring devices, comprising:
obtaining one or more first device signals from a first device coupled to a patient;
obtaining one or more second device signals from a second device coupled to said patient;

generating a first comparable signal from said one or more first device signals;
generating a second comparable signal from said one or more second device signals;
calculating a first frequency variation signal from said first comparable signal;
calculating a second frequency variation signal from said second comparable signal;
calculating a time shift applied to said first frequency variation signal that aligns said first frequency variation signal with said second frequency variation signal; and,
generating synchronized device signals comprising
said one or more first device signals shifted by said time shift; and,
said one or more second device signals;
wherein
said first device comprises a heart monitor;
said one or more first device signals comprise one or more heart monitor signals;
said second device comprises a brain monitor;
said one or more second device signals comprise one or more brain monitor signals;
said first comparable signal comprises a first heart activity signal;
said second comparable signal comprises a second heart activity signal;
said first frequency variation signal comprises a first RR-interval signal comprising time differences between peaks of R-waves of said first heart activity signal; and,
said second frequency variation signal comprises a second RR-interval signal comprising time differences between peaks of R-waves of said second heart activity signal.

2. The method for synchronizing biological signals from different monitoring devices of claim 1, wherein
said first frequency variation signal comprises time differences between peak values in said first comparable signal; and,
said second frequency variation signal comprises time differences between peak values in said second comparable signal.

3. The method for synchronizing biological signals from different monitoring devices of claim 1, further comprising:
coupling one or more sensors of said second device to said patient in locations proximal to corresponding one or more sensors of said first device;
generating said first comparable signal from data received from said corresponding one or more sensors of said first device; and,
generating said second comparable signal from data received from said one or more sensors of said second device.

4. The method for synchronizing biological signals from different monitoring devices of claim 1, wherein said generating said second comparable signal from said one or more second device signals comprises
transforming said one or more second device signals into one or more independent components; and,
identifying one of said one or more independent components as said second comparable signal.

5. The method for synchronizing biological signals from different monitoring devices of claim 1, wherein said generating said second comparable signal from said one or more second device signals comprises
generating a matched filter based on a reference first device signal;
applying said matched filter to said one or more second device signals to obtain one or more filtered signals; and,
calculating said second comparable signal based on said one or more filtered signals.

6. The method for synchronizing biological signals from different monitoring devices of claim 5, wherein said calculating said second comparable signal based on said one or more filtered signals comprises calculating said second comparable signal as an average of said one or more filtered signals.

7. The method for synchronizing biological signals from different monitoring devices of claim 1, wherein said calculating said time shift applied to said first frequency variation signal that aligns said first frequency variation signal with said second frequency variation signal comprises
calculating a cross correlation at a series of time offsets between
said first frequency variation signal, offset in time by each time offset of said series of time offsets; and
said second frequency variation signal; and,
calculating said time shift as a time offset corresponding to a maximum value of said cross correlation.

8. The method for synchronizing biological signals from different monitoring devices of claim 1, further comprising:
coupling one or more electrodes of said brain monitor to said patient in locations proximal to corresponding one or more electrodes of said heart monitor;
generating said first heart activity signal from data received from said corresponding one or more electrodes of said heart monitor; and,
generating said second heart activity signal from data received from said one or more electrodes of said brain monitor.

9. The method for synchronizing biological signals from different monitoring devices of claim 1, wherein said generating said second comparable signal from said one or more second device signals comprises
transforming said one or more brain monitor signals into one or more independent components; and,
identifying one of said one or more independent components as said second heart activity signal.

10. The method for synchronizing biological signals from different monitoring devices of claim 1, wherein said generating said second comparable signal from said one or more second device signals comprises
generating a matched filter based on a reference cardiac signal;
applying said matched filter to said one or more brain monitor signals to obtain one or more filtered signals; and,
calculating said second heart activity signal based on said one or more filtered signals.

11. The method for synchronizing biological signals from different monitoring devices of claim 10, wherein said calculating said second heart activity signal based on said one or more filtered signals comprises calculating said second heart activity signal as an average of said one or more filtered signals.

12. The method for synchronizing biological signals from different monitoring devices of claim 1, wherein said calculating said time shift applied to said first frequency variation signal that aligns said first frequency variation signal with said second frequency variation signal comprises
calculating a cross correlation at a series of time offsets between said first RR-interval signal, offset in time by each time offset of said series of time offsets; and
said second RR-interval signal; and,
calculating said time shift as a time offset corresponding to a maximum value of said cross correlation.

13. A method for synchronizing biological signals from different monitoring devices, comprising:
obtaining one or more first device signals from a first device coupled to a patient;
obtaining one or more second device signals from a second device coupled to said patient;
generating a first comparable signal from said one or more first device signals;
generating a second comparable signal from said one or more second device signals;
calculating a first frequency variation signal from said first comparable signal;
calculating a second frequency variation signal from said second comparable signal;
calculating a time shift applied to said first frequency variation signal that aligns said first frequency variation signal with said second frequency variation signal; and,
generating synchronized device signals comprising
said one or more first device signals shifted by said time shift; and,
said one or more second device signals;
wherein said calculating said time shift applied to said first frequency variation signal that aligns said first frequency variation signal with said second frequency variation signal comprises
calculating a cross correlation at a series of time offsets between
said first frequency variation signal, offset in time by each time offset of said series of time offsets; and
said second frequency variation signal; and,
calculating said time shift as a time offset corresponding to a maximum value of said cross correlation.

14. The method for synchronizing biological signals from different monitoring devices of claim 13, wherein
said first frequency variation signal comprises time differences between peak values in said first comparable signal; and,
said second frequency variation signal comprises time differences between peak values in said second comparable signal.

15. The method for synchronizing biological signals from different monitoring devices of claim 13, further comprising:
coupling one or more sensors of said second device to said patient in locations proximal to corresponding one or more sensors of said first device;
generating said first comparable signal from data received from said corresponding one or more sensors of said first device; and,
generating said second comparable signal from data received from said one or more sensors of said second device.

16. The method for synchronizing biological signals from different monitoring devices of claim 13, wherein said generating said second comparable signal from said one or more second device signals comprises
transforming said one or more second device signals into one or more independent components; and,
identifying one of said one or more independent components as said second comparable signal.

17. The method for synchronizing biological signals from different monitoring devices of claim 13, wherein said generating said second comparable signal from said one or more second device signals comprises
generating a matched filter based on a reference first device signal;
applying said matched filter to said one or more second device signals to obtain one or more filtered signals; and,
calculating said second comparable signal based on said one or more filtered signals.

18. The method for synchronizing biological signals from different monitoring devices of claim 17, wherein said calculating said second comparable signal based on said one or more filtered signals comprises calculating said second comparable signal as an average of said one or more filtered signals.

* * * * *